Aug. 12, 1969 P. R. BLEVINS ETAL 3,461,430

RECORD READER WITH CONTROLS

Filed Sept. 14, 1966 10 Sheets-Sheet 1

INVENTORS.
PARKER R. BLEVINS
RODERICK S. HEARD
LOUIS M. HORNUNG

BY Frank C. Leach Jr.
ATTORNEY

United States Patent Office 3,461,430
Patented Aug. 12, 1969

3,461,430

RECORD READER WITH CONTROLS

Parker R. Blevins, Roderick S. Heard, and Louis M. Hornung, Lexington, Ky., assignors to International Business Machines Corporation, Armonk, N.Y., a corporation of New York Filed Sept. 14, 1966, Ser. No. 579,355
Int. Cl. G11b *5/02;* G08b *29/00;* G06f *7/00;* G08c, *25/00;* G06k *7/016*
U.S. Cl. 340—172.5 16 Claims

ABSTRACT OF THE DISCLOSURE

A latch counter receives alternating signals from an emitter to control the position in storing means of each data bit read by a transducer from a record with each alternating signal being supplied prior to the transducer being positioned to receive the data bit from the record. The latches of the counter may be set in other combinations of unique states to control other functions of the reader. When the controlled function is completed, the counter and the storing means are returned to the zero count position in which further reading of the data bits on the record may occur for storage in the storing means.

This invention relates to a reader for reading information stored on a record or the like and, more particularly, to a record reader in which certain states of a latch clock are employed to control the storing of the information from the record in the reader and other states in the latch clock are utilized for performing other operation sequences beside reading.

In accordance with this invention, the storage of information from a magnetic or similarly readable record is controlled by the use of pulses created by a clock driven by signals created between the locations (channels or tracks) where bits of data will be on the record. A commutator or magnetic emitter arm is directly linked to the reading transducer and the pulse producing means of the cummutator, which may be a magnet and coil arrangement, for example, is arranged to produce a pulse before the transducer enters an area in which data appears. These cummutator pulses drive the clock, and the unique count status conditions of the clock automatically control the designation or definition of data read at various times.

The clock is preferably built entirely of switchable devices such as latches and requires a unique series of signals to each of two separate inputs of the clock. Each of the two series of signals preferably is created by electrically connecting different of the commutator outputs together and connecting these outputs as the two input signals to the clock.

Status conditions of the clock representing counts higher than those obtained in normal data reading are used to control functions of the reader. Examples of such functions are the function of loading a record into the reader and the function of searching for a start of message code on the record. The clock is arranged to be forced to these function status conditions in response to signals from a key or other suitable control means.

The record reader of the present invention is concerned with the "finding" of data on a record and the use of a clock or counter for both data finding and reader control. The use for record reading of pulses created by a commutator arm linked to a reading transducer is shown in United States Patent No. 3,192,515. In that patent, the pulses generated do not drive a clock.

However, the use of a counter to count pulses created in a time and space relationship to data signals is known in different environments such as illustrated by United States Patent No. 3,195,118. U.S. Patent No. 2,986,725 shows linking transducer movement to a signal source so as to create a pulse related to transducer movement to open a gate when transducer movement to read a record begins and to close a gate after the record has been read.

However, the known prior art does not provide the highly efficient system of the record reader of the present invention since none drives a clock especially suited for the purpose of both data finding and reader control.

While it is known to use the status of a latch clock to control functions of a data handling machine, the selection in this invention of a counting means, driven by alternating signals from a properly connected and selected commutator or magnetic emitter, provides a record reading unit with an optimized cost reduction.

It is an object of this invention to provide an improved record reader.

It is a further object of this invention to provide a record reader in which the required number of structures to produce the desired results is reduced to give a more economical apparatus.

It is another object of this invention to provide a record reader which is simplified in comparison with presently available readers whereby difficulties of production and maintenance are reduced.

It is still another object of this invention to utilize a single latch clock in a record reader for both data finding and control of the reader.

The foregoing and other objects, features, and advantages of the invention will be more apparent from the following more particular description of a preferred embodiment of the invention, as illustrated in the accompanying drawings.

Figure 7A:
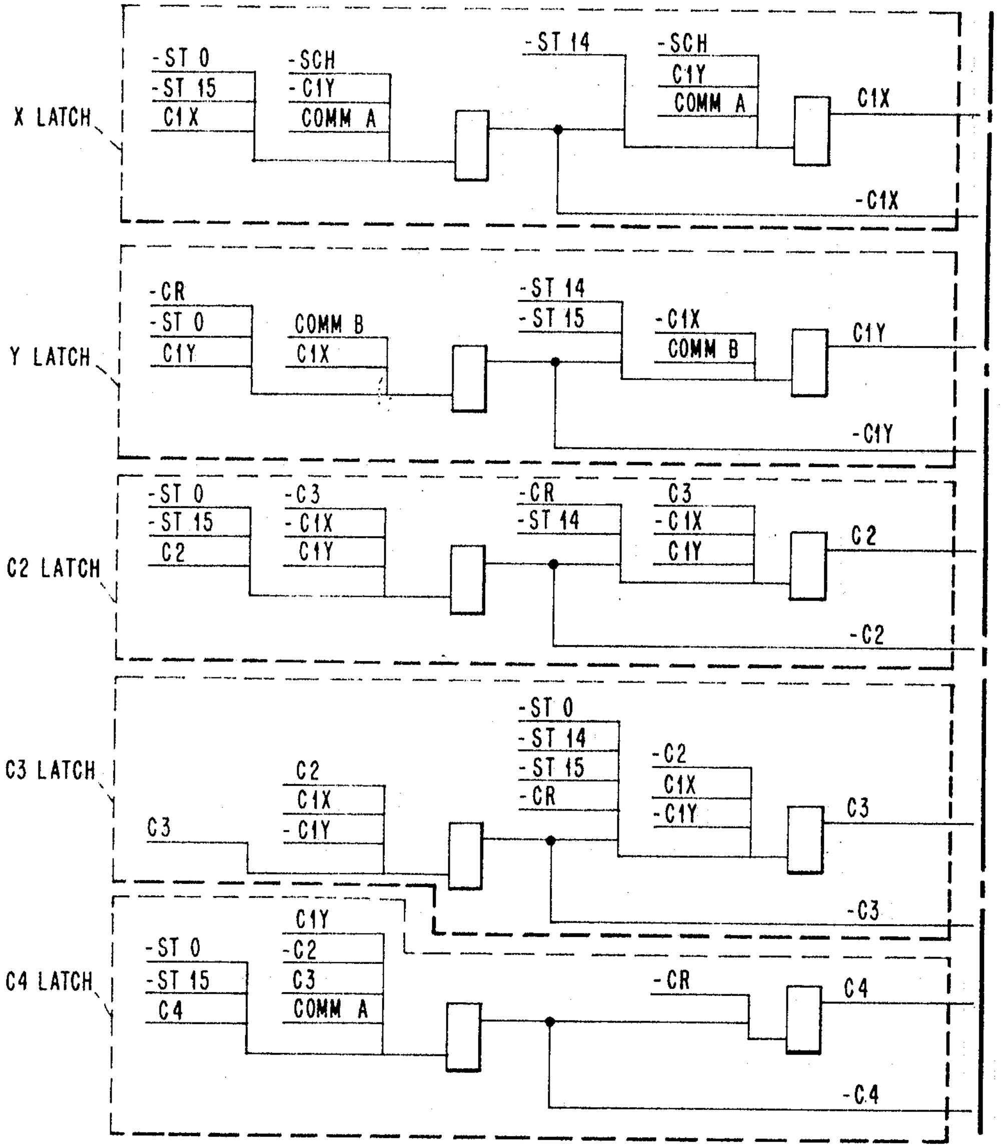
Figure 7B:
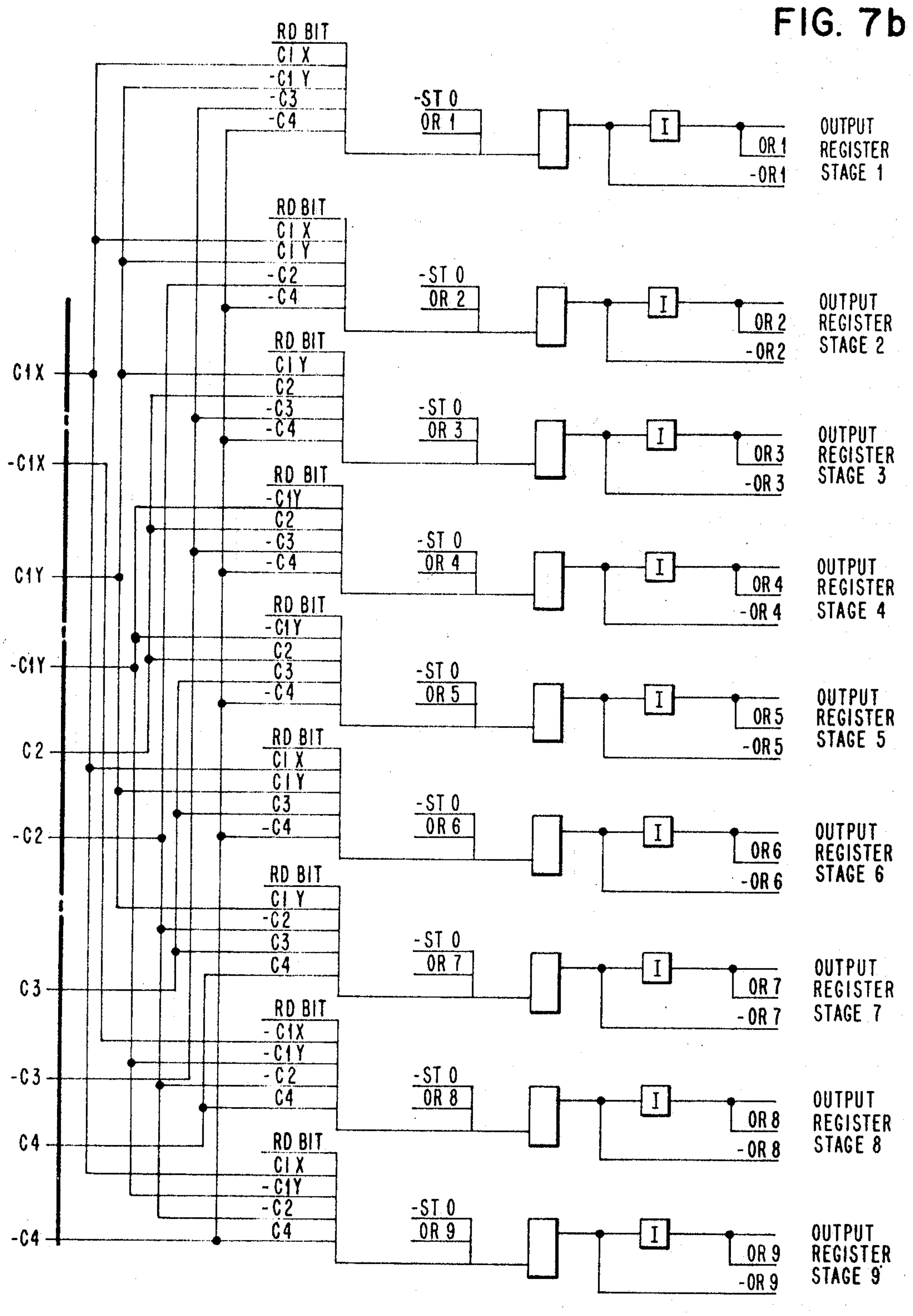

FIGS. 7*a* and 7*b* are logic diagrams, FIG. 7*b* being a continuation of the same logic diagram of FIG. 7*a*, wherein FIG. 7*a* shows a portion of the reader of the present invention including the latches of a clock or counter and FIG. 7*b* shows the latches of the output register.

Figure 8:
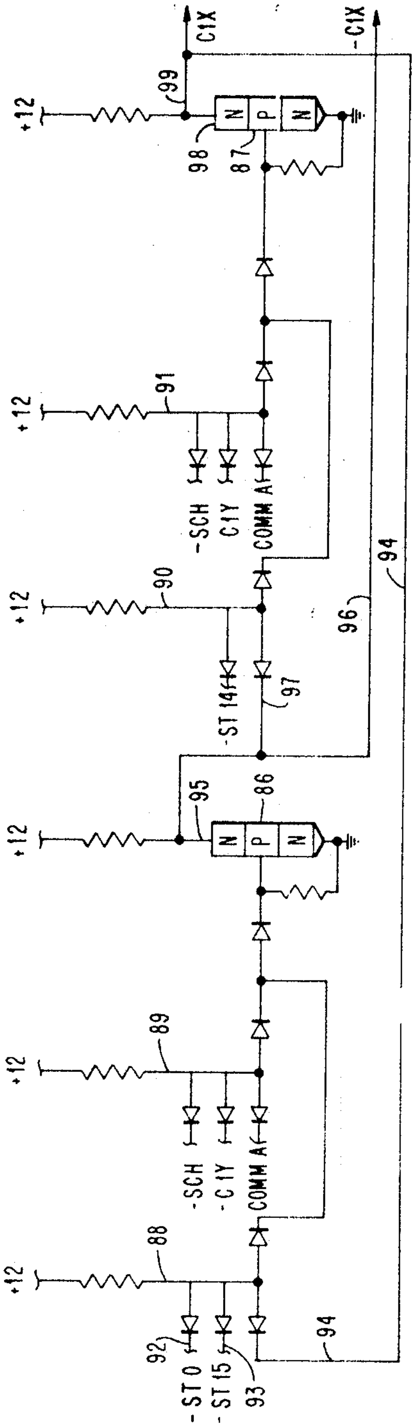

FIG. 8 is a schematic wiring diagram of the circuit of one of the latches of the counter or clock used in the reader of the present invention.

Figure 9:
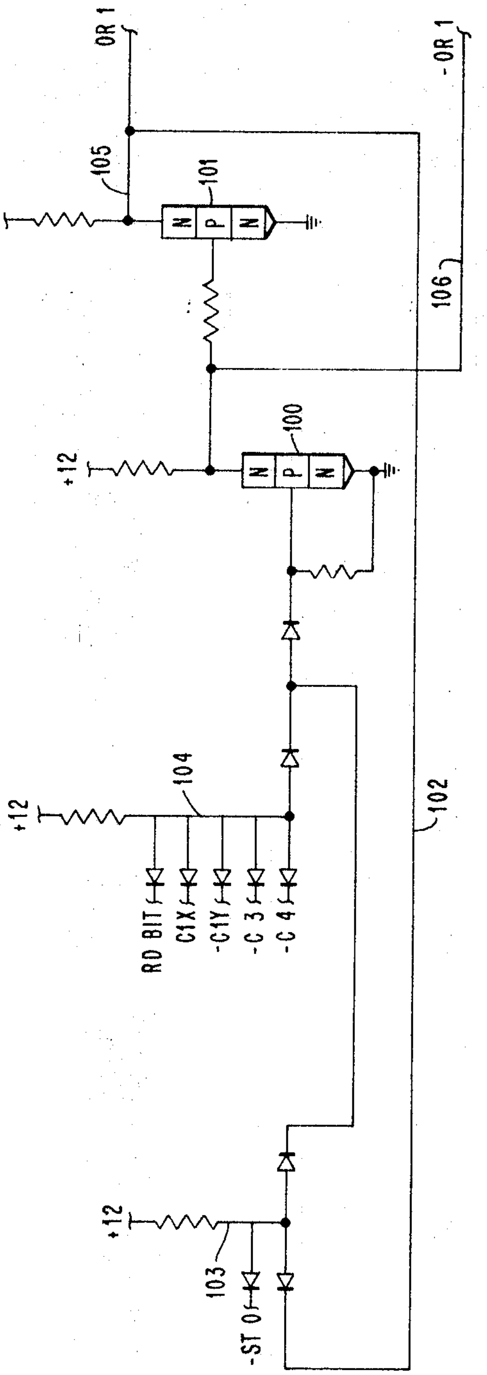

FIG. 9 is a schematic wiring diagram of one of the latches used in the output register of the reader of the present invention.

Figure 2:
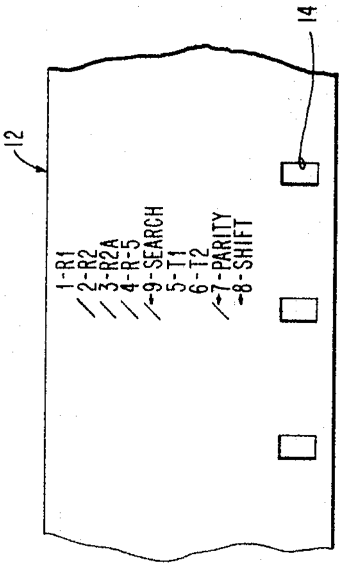
FIG. 2 is a top plan view of a portion of a magnetic tape that may be used in the reproducing unit of FIG. 1 and further shows the data-character format that is employed.
Figures 10, 18:
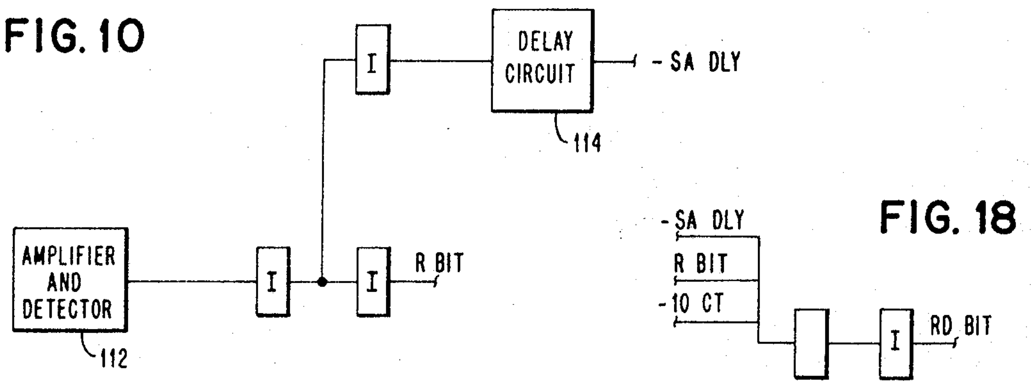

FIG. 10 is a schematic block diagram of the circuit used to shape the "one" data bits being supplied from the magnetic tape of FIG. 2 to the output register of the reader of the present invention.

Figure 11:
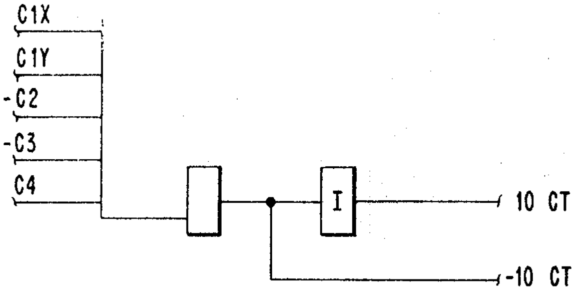

FIG. 11 is a logic diagram showing how the counter will indicate that all of the data bits from the magnetic tape have been received at the output register of the reader.

Figure 12:
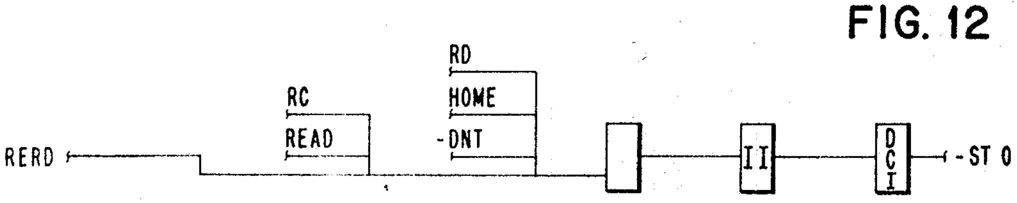

FIG. 12 is a logic diagram showing development of a ST 0 signal.

Figure 13:
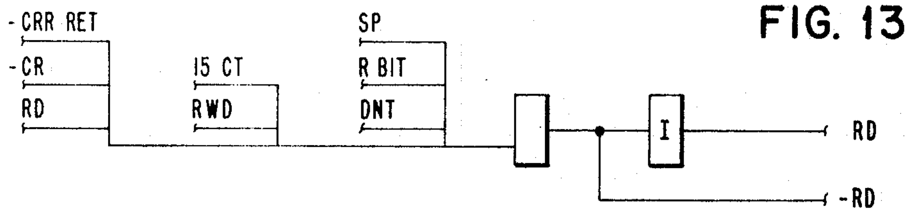

FIG. 13 is a logic diagram showing how an RD signal is developed.

Figure 14:
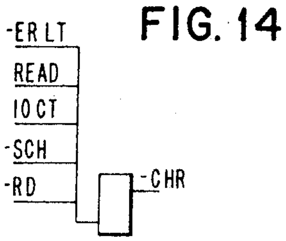

FIG. 14 is a logic diagram illustrating how a character ready signal is developed.

Figure 15:
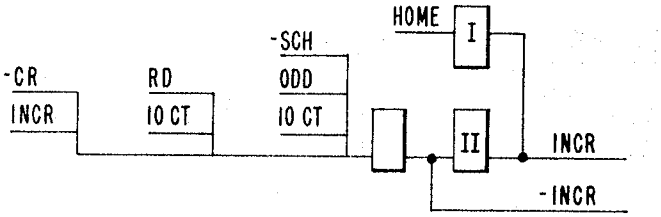

FIG. 15 is a logic diagram showing how a signal is developed to cause stepping advancement of the tape with respect to the transducer of the reproducing unit.

Figure 16:
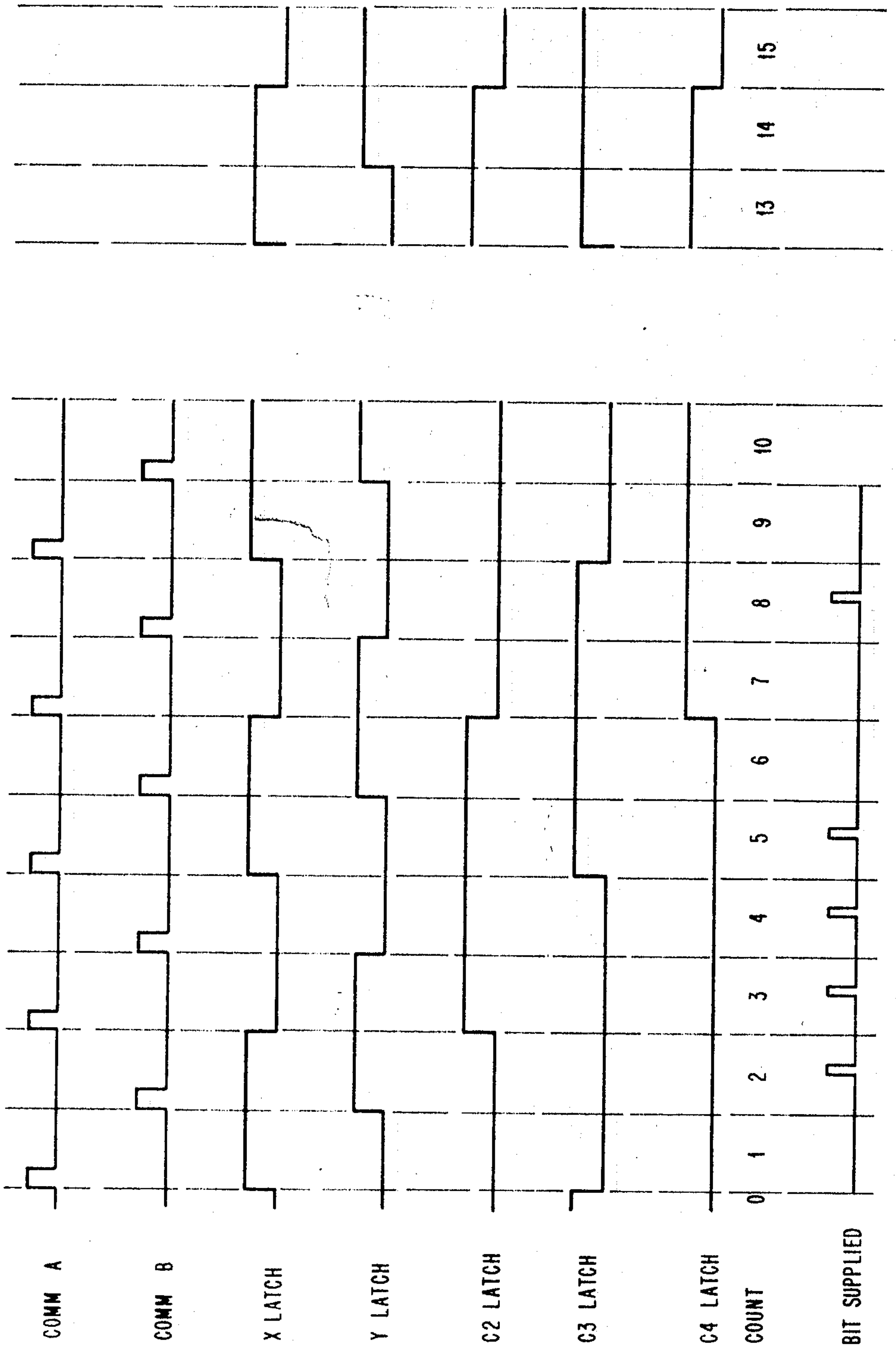

FIG. 16 is a sequence chart that shows various timing relationships of the signals supplied to the latch clock and the output register.

Figure 17:
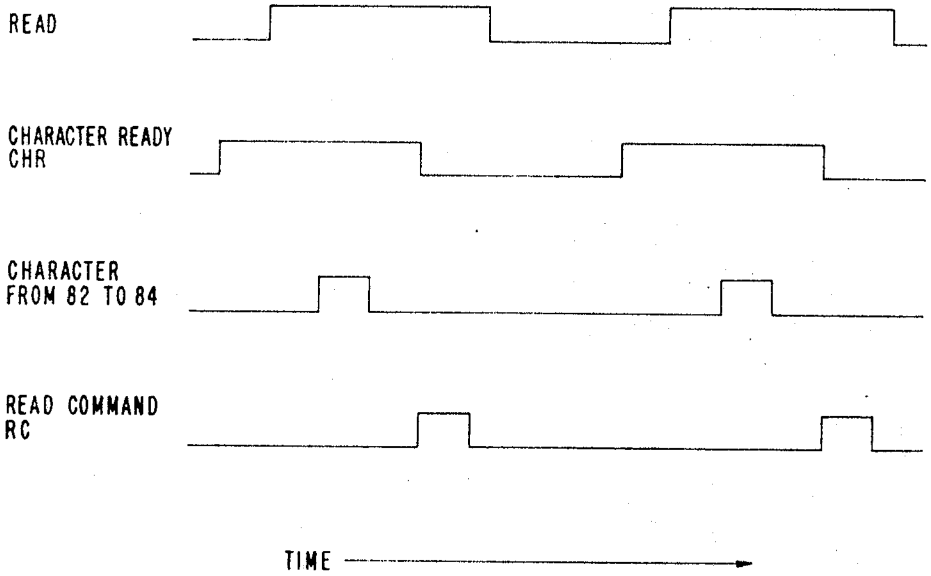

FIG. 17 is a sequence chart that shows various timing relationships of the signals concerned with reading the character at the output register into the data processing machine.

FIG. 18 is a logic diagram showing the development of an RD bit from the transducer for transmittal to the output register of the reader of the present invention.

Figure 19:
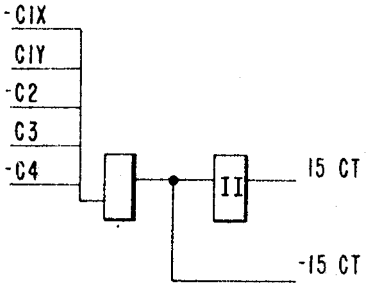

FIG. 19 is a logic diagram showing development by the latch clock or counter of a signal during loading of the tape in the reproducing unit.

Figure 20:
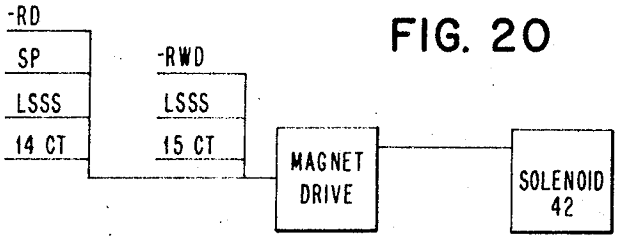

FIG. 20 is a logic diagram illustrating development of the signal for picking the detent solenoid.

Figure 21:
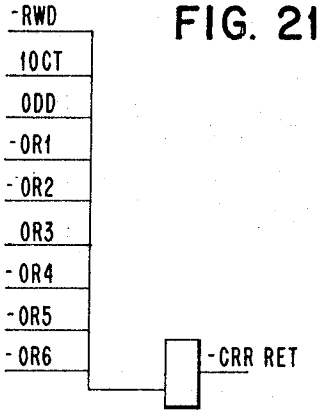

FIG. 21 is a logic diagram showing the development of a carrier return signal during loading or search operation to stop the loading or searching operation.

Figure 22:
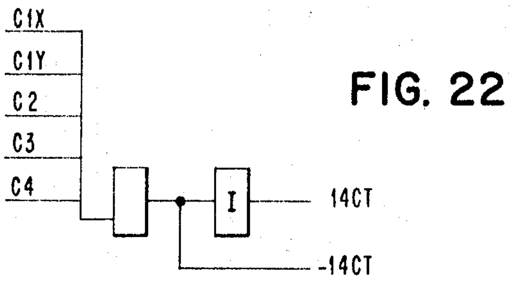

FIG. 22 is a logic diagram showing development by the latches of the latch counter or clock of a signal during the search operation.

Figure 23:
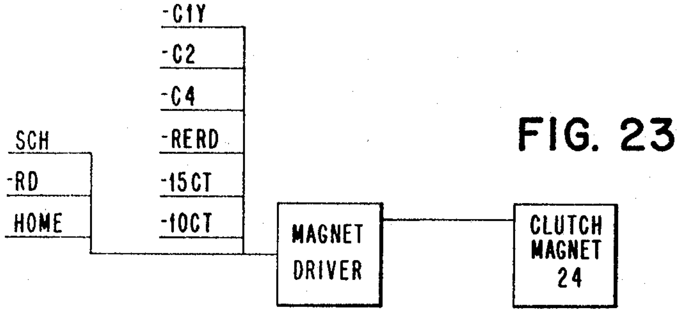

FIG. 23 is a logic diagram showing how a clutch magnet, which controls movement of the transducer across the tape, is energized and de-energized.

Figure 24:
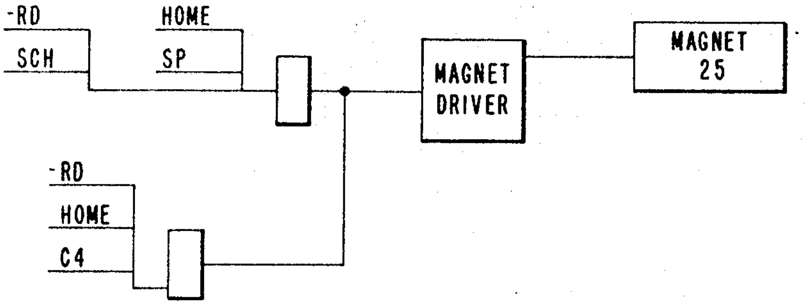

FIG. 24 is a logic diagram illustrating how a search position magnet is energized or de-energized.

Figure 25:
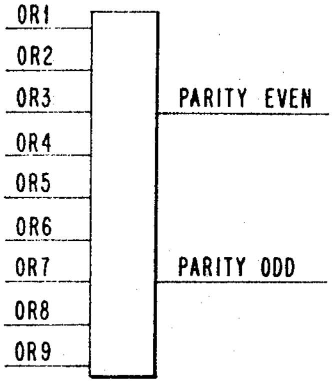

FIG. 25 is a schematic block diagram of a device for checking parity error.

Referring to the drawings and particularly FIGS. 1 to 4, there is shown a reproducing unit 10 similar to the unit, which is more particularly shown and described in the copending U.S. application of Donald E. Sims, Ser. No. 540,777, filed Apr. 6, 1966, and assigned to the same assignee as this application. The reproducing unit 10 has a transducer 11, which may be a magnetic head, for example, mounted for transverse movement with respect to a magnetic tape 12.

As shown in FIG. 2, the magnetic tape 12, which is the medium on which information is recorded and from which it is reproduced, has different combinations of binary bits recorded thereon in adjacent rows extending across the width of the tape 12. Different combinations of the binary bits, which may be thought of as "ones" and "zeros," are employed to represent various characters on the tape 12. It should be understood that the various markings on the tape 12 represent magnetized "one" bits only for purposes of description and explanation; in reality, the magnetized portions on a magnetic tape are not visibly distinguishable from unmagnetized portions.

Nine channels or bits are employed on the tape 12. These bits are designated in FIG. 2 and are described in more detail in the aforesaid Sims application.

The formation of the bits on the magnetic tape 12 may be provided by any suitable recording structure (not shown). One suitable example for forming the bits is described in the aforesaid U.S. Patent No. 3,192,515.

The bits are formed at an angle of 45° to both the transverse and longitudinal axes of the magnetic tape 12. This permits the transducer 11 to receive signals from the bits on the tape 12 when the transducer 11 is moved transversely of the tape 12, and it also allows the transducer 11 to receive signals from the tape 12 when the tape 12 is moved longitudinally with the transducer 11 being stationary. The longitudinal movement of the tape is accomplished through a sprocket 13 (see FIG. 3) of the reproducing unit 10 cooperating with sprocket holes 14 in the magnetic tape 12.

The reproducing unit 10 has a motor 15 (see FIG. 1) for rotating a drive shaft 16. The drive shaft 16 is connected through gears 17 and an associated shaft 18 for operating certain searching and stepping mechanisms to advance the tape 12 longitudinally.

A slide cam 19 is employed for driving a slide 20 on which the transducer 11 is mounted. The shaft 16 is connected through a clutch to the cam 19 to initiate transverse movement of the transducer 11 with respect to the magnetic tape 12 as more specifically described in the aforesaid Sims application.

The cam 19 is fixedly mounted on a driven sleeve, which is connected by the clutch to a drive sleeve fixedly attached to the drive shaft 16. The driven sleeve also has a magnetic emitter arm or commutator 21 fixedly connected thereto. Thus, the commutator or magnetic emitter arm 21 is linked to the transducer 11 so that the movements of both are synchronized with each other.

The drive shaft 16 is connected through suitable gearing, associated shaft, and a two-torque clutch, as shown and described in the aforesaid Sims application, to a shaft 22 adapted to receive a tape cartridge 23 thereon for rotation therewith. The tape cartridge 23 carries the magnetic tape 12 in the manner described in the aforesaid Sims application.

Through the two-torque clutch, the drive shaft 16 maintains a bias on the tape 12 whenever the tape 12 is being advanced forward. Whenever the tape 12 is being moved rearwardly, the shaft 22 has a high torque level applied thereto through the two-torque clutch to cause movement of the tape 12 in the rearward direction.

Figure 5:
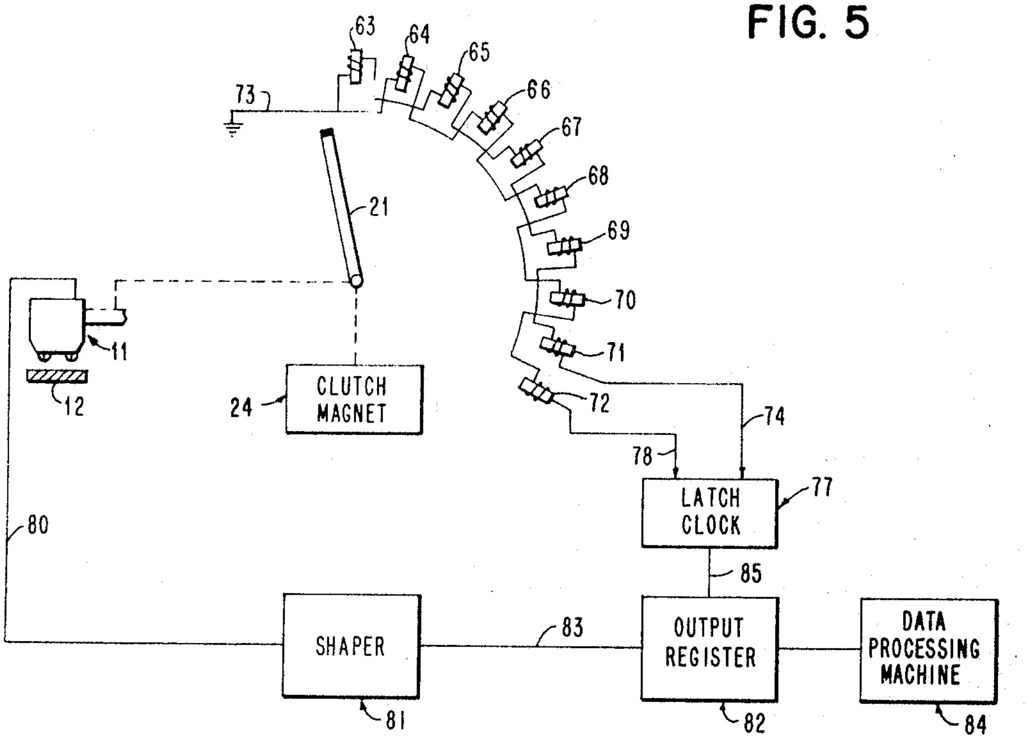
FIG. 5 is a schematic block diagram of certain components of the reproducing unit and the reader circuits of the present invention.
Figure 6:
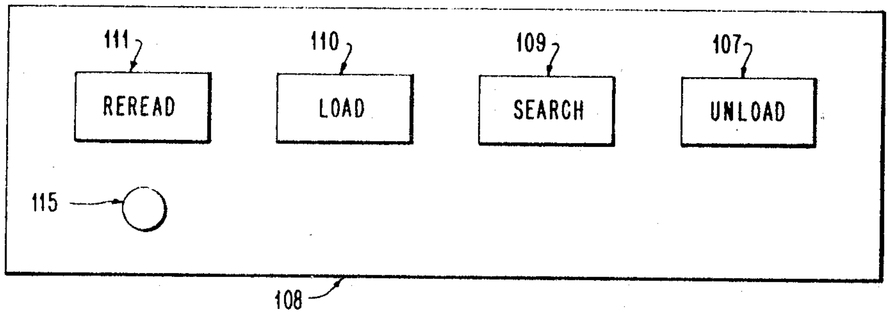
FIG. 6 is a top plan view of a portion of a keyboard of a data processing machine used with the reader of the present invention.

Whenever a clutch magnet 24 (see FIG. 5) is energized, the clutch engages the driven sleeve with the drive sleeve on the drive shaft 16. This causes the transducer 11 to be moved transversely across the tape 12 due to the cooperation of a follower on the slide 20 (see FIG. 1) with the cam 19.

A spring 24' carries the transducer 11 to its home position. The spring 24' is aided by a rebound spring (not shown) that cushions the end of the movement of the transducer 11 away from its home position and aids in accelerating the transducer 11 back to its home position. This is more particularly shown and described in the aforesaid Sims application.

During normal reading operations by the reader of the present invention, a search position magnet 25 is energized during each cycle of transverse movement of the transducer 11. This energization of the magnet 25 causes its armature 26 to be held down against the force of a biasing spring 27. Thus, the slide 20 is free to move in both directions.

However, if a search operation is to be performed by the reader of the present invention, the search position magnet 25 remains de-energized as it is de-energized at the end of each tranverse cycle of the transducer 11. As a result, the spring 27 will pull the armature 26 up so that return movement of the transducer 11 to its home position after it has moved across the tape 12 will be prevented by engagement of an extension 28 on the slide 20 with the armature 26. This positions the transducer 11 so that it is disposed over a search track or channel on the magnetic tape 12. This search track or channel is indicated in FIG. 2.

When the armature 26 is engaged by the extension 28 on the slide 20, a search switch assembly 29 is operated. This indicates that the transducer 11 is properly positioned for searching the search track or channel on the tape 12.

In order to restore the transducer 11 to its home position, the search position magnet 25 must again be picked. When this occurs, the spring 24' returns the transducer 11 to its home position. When the transducer 11 is in its home position, a home switch assembly 30 is operated.

The switch assembly 30 is operated during each transverse cycle of the transducer 11 to indicate when the transducer 11 has left its home position and when it has returned to its home position.

Forward stepping of the tape 12 is under the control of a stepping ratchet 31 (see FIG. 4), which is mounted on a shaft 31′. The advancement of the stepping ratchet 31 results in the sprocket 13 driving the tape 12 forward. The ratchet 31 is retained in position by a detent 32, which is fixed to a pivotally mounted detent lever 33.

Forward stepping (clockwise as viewed in FIG. 4) of the ratchet 31 is accomplished when two conditions occur. First, a magnet 34 is energized. This causes its armature 35, which has its end bearing against a resiliently biased pawl 36 on a pivotally mounted stepping arm 37, to be positioned for engagement with one of the teeth of the ratchet 31.

The second of the conditions occurs when the stepping arm 37 is pivoted clockwise (as viewed in FIG. 4) about the axis of a stepping shaft 38. This occurs when a stepping cam 39, which is mounted on the driven sleeve having the cam 19 thereon, engages a cam follower 40 on a stepping lever 41, which is secured to the shaft 38, to cause pivoting of the stepping lever.

The rotation of the arm 37 moves the pawl 36 into a tooth on the ratchet 31 to cause it to rotate. When this occurs, the detent 32 is cammed into the next tooth, and the tape 12 is advanced one step. Each step advances the tape 12 the distance between transverse rows of the binary bits thereon.

Under search and load conditions, it is desirable to advance the tape 12 at a very rapid speed. Accordingly, it is necessary to disengage the detent 32 from the ratchet 31 to permit rapid rotation of the shaft 31′ whereby the tape 12 may be driven at a rapid rate.

Energization of a detent solenoid 42 causes a pivotally mounted lever 43 to rotate clockwise. The lever 43 has a finger 44 on its upper end for engaging one end of the detent lever 33. This causes clockwise rotation of the lever 33 about its pivot whereby the detent 32 is moved out of engagement with the teeth on the ratchet 31.

At the same time during load and search but not during unload, a shoe 45 on the lever 43 is brought into contact with a clutch spring 46 to change the driving relationship of a two-torque clutching mechanism, which connects the shaft 18 to the shaft 31′, so that the shaft 31′ may rotate at a much faster speed than when merely forward stepping through the pawl 36. A switch assembly 47 indicates that the detent 32 has been removed from engagement with the teeth on the ratchet 31.

Figure 1:
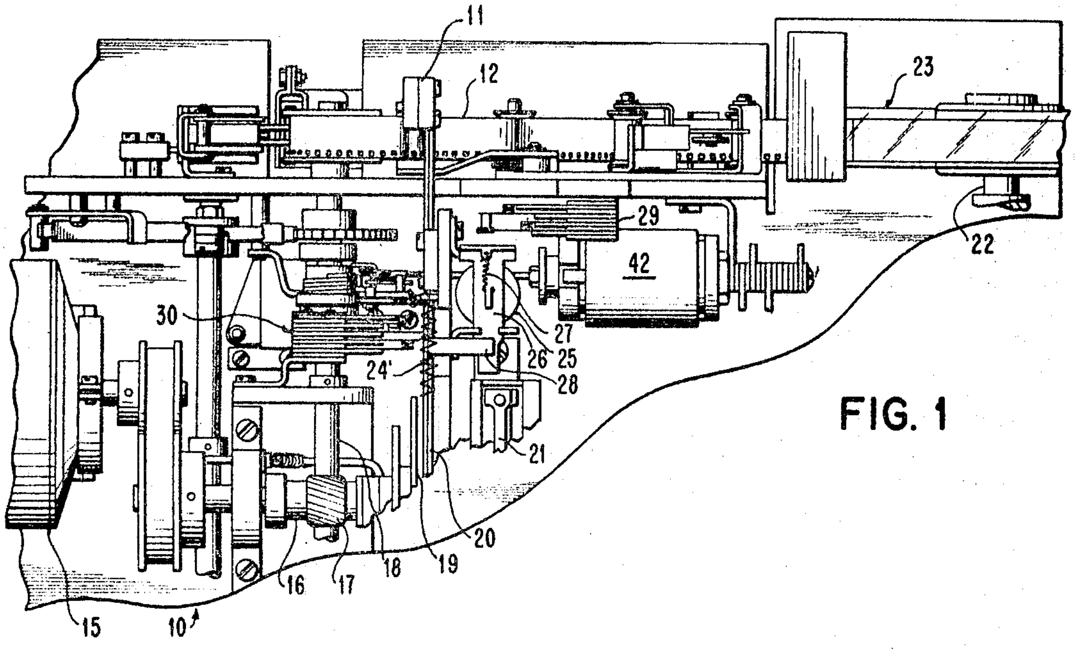
FIG. 1 is a top plan view of a portion of a magnetic tape reproducing unit that is used as part of the reader of the present invention.
Figure 3:
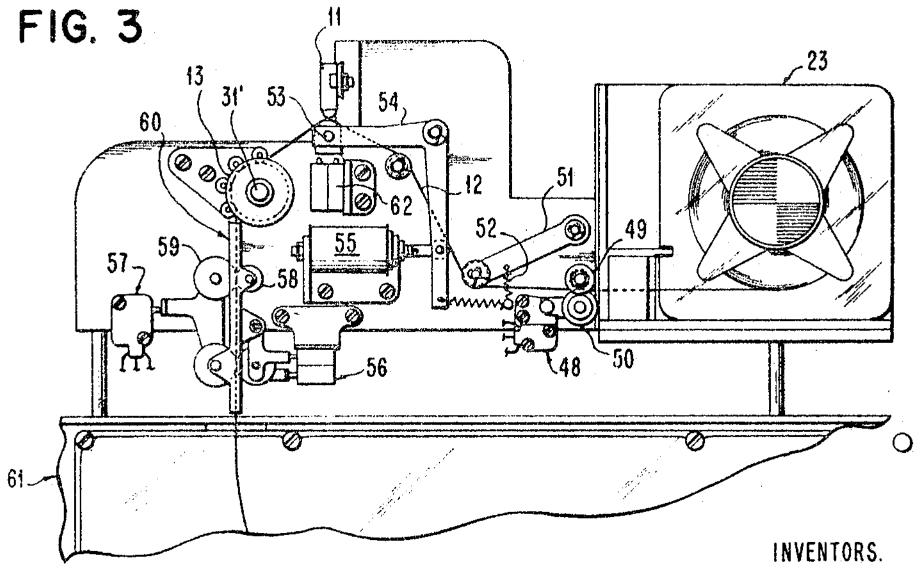
FIG. 3 is a side elevational view of the unit of FIG. 1.
Figure 4:
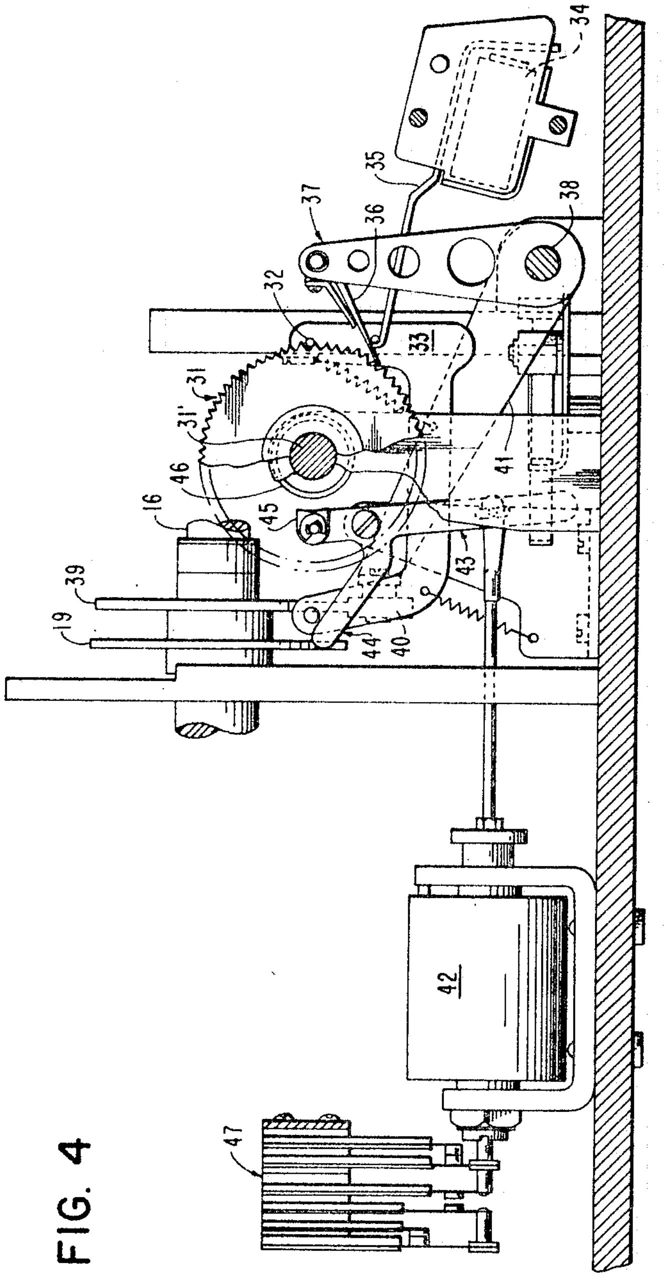
FIG. 4 is a side elevational view, partly in section, showing certain of the mechanism in the magnetic tape reproducing unit of FIG. 1 for effective forward stepping of the magnetic tape of FIG. 2.

As shown in FIG. 3, the reproducing unit 10 has a switch assembly 48 to indicate when the end of the tape 12 has been reached. This is accomplished by providing a wide longitudinal slot in the tape 12 and having a roller 49 fall into a clearance on a roller 50 to cause actuation of the switch assembly 48.

A buffer arm 51 maintains a certain amount of tension on the tape 12 under the influence of spring 52. The tape 12 passes over the top of a pressure pad 53, which is mounted on a resiliently biased bellcrank 54. When a solenoid 55 is energized, the bellcrank 54 is pivoted to raise the pressure pad 53 to move the tape 12 into contact with the transducer 11. However, this does not occur until after a steel leader portion, which is attached to the tape 12, passes a leader sensing switch 56 and a load sensing switch 57 is actuated.

The load sensing switch 57 is actuated when a roller 58 falls into a small clearance in a roller 59 due to a longitudinal slot in the tape 12. The longitudinal slot in the forward portion of the tape 12 is of a narrower width than the longitudinal slot at the rear of the tape 12 so that the roller 49 cannot fall through the longitudinal slot in the forward portion of the tape 12.

The leader sensing switch 56 senses when the leader passes it due to the width of the leader changing and is employed during the unload operation. A tape chute 60 is provided to mount the switches 56 and 57 and to insure that the tape 12 passes into a tape bin 61.

A switch assembly 62 is disposed adjacent the pressure pad 53. When the pad 53 is not in its raised position, the switch assembly 62 prevents energization of the stepping magnet 34 (see FIG. 4).

During reading in accordance with this invention, the tape 12 is advanced longitudinally in one row increments by the stepping mechanism of the reproducing unit 10. In the periods of time between advances of the tape 12, the head 11 is swept transversely of the tape 12 with its reading gap in close proximity to the tape 12 as shown in FIG. 3 due to the position of the pressure pad 53.

The commutator or magnetic emitter arrangement includes a plurality of inductive windings 63–72 (see FIG. 5), which are permanently mounted on the reproducing unit 10, with each having a soft iron core. The arm 21, which is made of permanent magnetic material and functions as an armature, is rotatable clockwise (as shown in 63–72 progressively so as to induce an electrical potential FIG. 5) so as to pass each of the cores of the windings in each of the windings as it is passed by the arm 21.

In accordance with this invention, the alternate windings 63, 65, 67, 69, and 71 are connected together in a series circuit, which is connected to ground by a lead 73. The alternate windings 64, 66, 68, 70, and 72 are connected together in a second series circuit, which also is connected to ground by the lead 73.

The windings 63, 65, 67, 69, and 71 are connected to a common lead 74 whereby an output signal occurs on the lead 74 whenever the arm 21 passes one of the windings 63, 65, 67, 69, and 71 to induce an electrical potential therein. The lead 74 connects this output pulse, which will be called COMM A, to a latch clock or counter 77, which is shown in detail in FIG. 7*a*.

The windings 64, 66, 68, 70, and 72 are connected by a lead 78 to the latch clock or counter 77. This input from the lead 78, which occurs whenever the arm 21 passes one of the windings 64, 66, 68, 70, or 72 to induce an electrical potential therein, will be called COMM B.

Accordingly, two out of phase signals are supplied to the latch clock 77 with each being equally spaced in time from the other. These signals are employed to control the various latches of the latch clock or counter 77.

A lead 80 connects the transducer 11 with a read amplifier and pulse shaper 81, which is shown in detail in FIGS. 10 and 18. The shaper 81 not only amplifies and clips the top of the pulses, which have been read magnetically by the transducer 11 on the magnetic tape 12, but also limits the width of the pulse. This reduces the amount of time that the signal, which has been read, is supplied to an output register 82, which is shown in detail in FIG. 7*b*.

The shaper 81 is connected to the output register 82 through a lead 83. The signal from the shaper 81 is supplied in parallel to all nine stages of the output register 82. Thus, any bit, which appears on the tape 12 and is read by the transducer 11, is supplied to an input of each of the nine stages of the output register 82, which has its output connected to a data processing machine 84. However, each input bit is actually effective with only one stage of the output register 82. This particular stage is determined by the latch clock 77.

When the clutch magnet 24 (see FIG. 5) is picked, it connects the driven sleeve to the drive shaft 16 whereby the commutator or magnetic emitter arm 21 starts to rotate simultaneously with transverse movement of the transducer 11. The position of the arm 21 with respect to the first winding 63 is correlated to the position of the transducer 11 with respect to the first channel or track on the tape 12 so that the signal, which results from the arm 21 passing the winding 63, arrives at the latch clock 77 and the signals from the latch clock 77 are transmitted through a lead 85 to the output register 82 before the transducer 11 reads the first channel or track on the tape 12. Thus, the COMM A pulse is transmitted over the lead 74 to the latch clock 77, and the latches of the latch clock 77 create signals, which are transmitted over the lead 85 to the output register 82, before any data bit from the transducer 11 arrives at the output register 82.

This arrangement insures that each signal, whether a "one" or "zero" bit, from the transducer 11 is properly stored in the correct stage of the output register 82. Thus, the latch clock 77 controls the storing of the signals in the output register 82 from the transducer 11.

Both the latch clock 77 and the output register 82 comprise a plurality of latches. A latch is a bistable device having one normal state and being capable of assuming a second state in response to a signal at its input. Latching action is obtained by connecting the output of the latch to the input of the same latch so that a switched status is fed back to the input to hold the circuit in the status assumed when the input was operative initially.

A latch, as used in the latch clock 77 of the invention, is shown in FIG. 8. The logic used is constructed to always be responsive to an up or positive voltage signal (+12 volts).

Therefore, the latch has two active elements such as transistors 86 and 87, for example. Each of logic leads 88–91 has inputs, which make up what will be recognized as an AND circuit. If a positive voltage signal is brought onto every input of one of the logic lines 88–91, a high potential is directed to one of the transistors 86 and 87.

For example, when approximately +12 volts is brought onto all of the input lines 92–94 of the logic lead 88, current flow from the +12 volt supply to the logic lead 88 is blocked on the side electrically away from the transistor 86 and is, therefore, effective to trigger the transistor 86 on. This is similarly true if all of the lines connected to the logic lead 89 are brought to approximately +12 volts regardless of the status of the lines to the logic lead 88.

Bringing the transistor 86 on has the effect of bringing toward ground potential point 95, which is associated with the transistor 86. Thus, lead 96, representative of the NOT condition of the latch, is brought to approximately ground. With the lead 96 at ground potential, none of the logic, which requires a NOT signal from this latch, will be activated since the circuits are normally responsive to up or positive signals.

The ground condition at the collector of the transistor 86 is operative through a lead 97 to bring the transistor 87 to an "off" condition provided that at least one of the input lines to the logic line 91 is down. This brings collector 98 of the transistor 87 to +12 volts since +12 volts is connected to the transistor 87.

Thus, output lead 99 of the latch of FIG. 8 is brought to a condition of +12 volts, which indicates that the latch is on or up. This is immediately fed back through the line 94, and if approximately +12 volts are on the lines 92 and 93, all of the inputs to the logic lead 88 are satisfied, and the latch will be held in its changed status to continuously produce the +12 volt signal on the lead 99.

Brief reference now will be made to FIG. 9, which is illustrative of a latch used as one stage of the output register 82. The latch has two active elements such as transistors 100 and 101, for example. The output signal is fed back by a lead 102 in the manner of the latch described in FIG. 8, and the latch has logic leads 103 and 104 similar to those of FIG. 8.

It will be immediately recognized that if all the input lines to the lead 103 or the lead 104 are in a +12 volt status, an output line 105, which is indicative of a "yes" or up status of OR1 will be at a +12 volt level. On the other hand, if —ST0 input to the logic lead 103 and at least one of the input lines to the logic lead 104 are not at approximately +12 volts, the transistor 100 will be "off" and approximately +12 volts will appear on an output lead 106, which is indicative of —OR1.

Before describing in detail the various circuits involved and their interrelationship, the following vocabulary will be defined:

10 CT.—This is a signal, which is the result of the logic of the latch clock 77, to indicate the reading of the magnetic tape 12 by the transducer 11 has been completed. This count discloses that the count of the latch clock 77 is at ten. It will be recalled that the data on the magnetic tape 12 comprises eight information bits and one parity or error check bit.

13 CT.—This signal indicates a count status to which the latch clock 77 is forced by a common reset (CR) signal. No logic of the latch clock 77 is directly sensitive to this count status, and it is used to positively keep the latch clock 77 in a status different from which its logic responds.

14 CT.—This is the status signal indicating that the latch clock 77 stands at a count of fourteen. The latch clock 77 is set to this count by depression of a search key 109 on a keyboard 108. This count status is employed as a logical signal to cause a search of the magnetic tape 12 along only its search track by the transducer 11 until a coded signal is found in that search track to indicate that a new message is found.

15 CT.—This is a status signal indicating that the latch clock 77 stands at a count of fifteen. The latch clock 77 is set to this count by depression of a load key 110 on the keyboard 108. The count status is used as a logical signal to cause loading of the magnetic tape 12 in the reproducing unit 10.

C1X and —C1X.—Signals from a first or X latch of the latch clock 77 and indicative of the status of the latch.

C1Y and —C1Y.—Signals from a second or Y latch of the latch clock 77 and indicative of the status of the latch.

C2 and —C2.—Signals from a third or C2 latch of the latch clock 77 and indicative of the status of the latch.

C3 and —C3.—Signals from a fourth or C3 latch of the latch clock 77 and indicative of the status of the latch.

C4 and —C4.—Signals from a fifth or C4 latch of the latch clock 77 and indicative of the status of the latch.

COMM A.—A commutator pulse created from the arm 21 passing one of the commutator windings 63, 65, 67, 69, and 71.

COMM B.—A commutator pulse created from the arm 21 passing one of the alternate windings 64, 66, 68, 70, and 72.

CR—COMMON RESET.—A signal created by certain relatively infrequent machine conditions when clearing of various logic is required. This signal becomes a YES signal when the sensing switch assembly 48 observes the end of the magnetic tape 12, when an unload key 107 of the keyboard 108 is depressed if the switch 56 of the reproducing unit 10 notes that the tape 12 is not unloaded, and by a signal from the data processing machine 84 every time that power is brought on or taken off of the data processing machine 84.

CRR RET.—This is a signal, which is found on the magnetic tape 12 during a load or search operation after the transducer 11 has started to move transversely across the tape 12 to find this signal. It is only after this signal is located that signals may be transmitted from the output register 82 to the data processing machine 84.

DNT.—This signal is created by the switch assembly 47 when the detent solenoid 42 is energized to remove the detent 32 from the ratchet 31.

—DNT.—This signal is created by the switch assembly 47 when the detent 32 is engaged with the ratchet 31 and indicates that the detent solenoid 42 is not picked.

HOME.—A signal created by the closing of the home switch assembly 30 by the physical position of the transducer 11 when the transducer 11 is positioned to start a sweep of the tape 12.

INCR.—This is a signal created by the logic of FIG. 15. It is employed to pulse the stepping magnet 34 for advancing the magnetic tape 12 one step.

OR1, OR2, OR3, OR4, OR5, OR6, OR7, OR8, OR9.—These are the outputs of the nine latches in the output register 82. They are created by the presence or absence of a bit signal from the reading of the magnetic tape 12. Each signal is entered into the proper latch directly under the control of the latch clock 77.

R Bit.—This is a bit which has been read from the tape 12 by the transducer 11 and amplified and shaped through the shaper 81.

RC—Read Command.—A signal from the data processing machine 84. This signal is down and comes up to a positive voltage automatically after the data processing machine 84 is finished reading from the output register 82. This signal returns to down automatically but initiates the signal for the next read operation.

RD Bit.—This is a signal in response to a bit read by the transducer 11.

READ.—A signal, which is a function of the signals from the data processing machine 84, that indicates the reader is to be read by extracting the signals from the output register 82.

RERD.—A signal created by depression of a reread key 111 on the keyboard 108 by the operator to create a voltage signal (+12 volts) which causes, after its termination, the reading of the tape 12 by the transducer 11.

RWD.—A signal automatically created by the switch 57 sensing a longitudinal slot in the tape 12 to indicate the start of a useful record portion on the tape 12 is located for reading by the transducer 11.

—SA DLY.—This is a signal, which is a delayed NOT R Bit, and is delayed slightly by a delay circuit 114 of FIG. 10. This cooperates with the R Bit and other circuitry of FIG. 18 to limit the width of the pulse supplied to the appropriate stage of the output register 82.

SCH.—A signal, indicative of search, created by 14 CT signal. This signal occurs during the searching operation.

ST 0 (Set 0).—A signal used to clear the latches of both the latch clock 77 and the output register 82 for another cycle of reading of the tape 12 by the transducer 11. A YES ST 0 signal (+12 volts) is created during a load operation, a reread operation, a search operation, and by signals from the data processing machine 84 when a character of data has been read from the output register 82.

ST 14 (Set 14).—A signal created by the depression of the search key 109 and is ultimately operative to cause a search operation.

St 15 (Set 15).—A signal created by the depression of the load key 110 and is ultimately operative to cause a load operation.

The ST 0 signal is created by the logic circuit of FIG. 12. The signal is inverted so that a NOT set zero (—ST 0) signal occurs unless one of the logic legs is satisfied.

The read command signal (RC) is automatically generated by the data processing machine 84 when it is desired to read data. The READ signal is indicative of a selection of the specific magnetic tape reader since there may be more than one input device from which the data processing machine 84 can select. Therefore, in a normal reading operation, as soon as the data processing machine 84 can receive data, RC and READ come up as indicated in FIG. 17 but both are dropped automatically before data is again read by the transducer 11.

Since the middle logic leg of FIG. 12 is satisfied by RC and READ being up, a ST 0 signal is produced by the circuit of FIG. 12. This moves the latch clock 77 to 0 CT whereby —C1Y, —C2, and —C4 are up. These signals along with there being no RERD signal and the clock 77 not being at 10 CT or 15 CT results in picking of the clutch magnet 24 due to the right logic leg of FIG. 23 being satisfied. This picking of the clutch magnet 24 causes the transducer 11 to begin a sweep and the arm 21 to start to rotate.

As the transducer 11 begins its sweep, the arm 21 first intersects the coil 63, and a COMM A pulse is created on the line 74 as previously described. This COMM A pulse is supplied to the X or first latch of the latch clock or counter 77 (see FIG. 7*a*).

Reference to the second logical AND circuit from the left in the X or first latch of the latch clock or counter 77 of FIG. 7*a* indicates that C1X is brought to an up condition by production of a COMM A pulse. This is true because there is a —SCH (not search) signal, —C1Y is up, and a COMM A pulse is being supplied.

The produced C1X pulse immediately appears on the logical circuit at the left in the X latch. Since —ST 0 and —ST 15 are existent, the three requirements are satisfied and C1X is latched in its up condition. It should be understood that —ST 0 occurs as soon as RC goes down. The data processing machine 84 automatically cuts off RC a predetermined time after the machine 84 automatically generates RC.

Subsequently, the transducer 11 may or may not encounter a magnetic "one" bit impressed on the magnetic tape 12 in the first channel or track (R1). If a magnetic "one" bit is encountered, the signal is directed to the circuit of FIG. 10.

If a magnetic bit is read by the transducer 11, it is supplied by the lead 80 to an amplifier and detector 112 (see FIG. 10). This clips the top of the pulses. The shaped signal is then supplied as an R Bit as one input to a single logic line of FIG. 18.

The signal, which has been amplified and clipped, also is supplied to a delay circuit 114. This output of the circuit 114 is also connected to the logic lead of FIG. 18.

When the R Bit is supplied to the circuit of FIG. 18, the logic line is satisfied. This is because the latch clock 77 is at count one so that —10 CT is up. Likewise, since the signal of the delay circuit 114 due to an R bit will not arrive at the input of FIG. 18 until after the R Bit, —SA DLY is up because the output of the delay circuit 114 due to the R Bit is a delayed NOT R bit.

Accordingly, when the R Bit arrives at the logic line, an RD Bit is produced. It ceases as soon as —SA DLY goes down (this is due to the R Bit being supplied to the delay circuit 114) and arrives at the logic line of FIG. 18. This is due to the R Bit causing —SA DLY to go down. Thus, the logic line is no longer satisfied, and the RD Bit is no longer transmitted. Accordingly, the RD Bit is transmitted for only a very short period of time to relax the adjustment tolerances involved with the relative positioning of the arm 21 to the transducer 11.

Referring to FIG. 7*b*, the RD Bit occurs on the left logic lead of the first stage of the output register 82. Thus, RD Bit C1X, —C1Y, —C3, and —C4 are all up so that OR1 is up. As the logic is satisfied, there is a feedback of OR1 to the right logical circuit where both —ST 0 and OR1 are yes. Thus, OR1 is latched in the first output register stage. Inspection of the logic of all other stages will show that the logic of these is not responsive.

Therefore, the existence of a pulse on the tape 12 is operative to switch stage 1 of the output register 82, and the switch condition is latched in as described with respect to FIG. 9. If no bit had occurred on the tape 12, OR1 would not have been switched since the logical requirement of an RD Bit in the left logic leg would not have occurred.

The commutator or emitter arm 21 next intersects the winding 64 and creates a COMM B pulse. This pulse is operative to make C1Y yes. C1X is still up due to the left logic leg of the X latch being satisfied.

The logic operative to set C1Y is found in the second logic circuit from the left in the second or Y latch as it requires both a COMM B pulse and C1X to be up. These both occur. Thus, there is a feedback of this switched condition to the first logic leg on the left of the Y latch. All conditions are satisfied since both —CR and —ST 0 are up and C1Y has just been created. Therefore, C1Y is latched up, and C1X remains latched up.

If a bit is encountered in the second channel or track (R2) of the tape 12, it is processed by the circuits of FIGS. 10 and 18 as previously discussed. When the RD Bit signal is created, it will be operative only in the second stage of the output register 82.

Thus, the left logical leg of output register stage 2 of FIG. 7*b* is satisfied. There is an RD Bit, and C1X, C1Y, —C2, and —C4 are up as required. An OR2 signal is created and appears at the left logical leg. Since —ST 0 is up as the latch clock 77 is not at 0 CT, the output register stage 2 is latched up. Inspection of all of the logic inputs to all of the other output register stage latches will establish that the status of the count bits is such that none of the logic legs is responsive to the RD Bit even though the RD Bit is an input to every output register stage.

The commutator arm 21 next intersects the winding 65 and creates another COMM A pulse. This is effective to turn C1X off.

This can be established by reference to the first logic leg from the right in FIG. 7*a*. This is a not search condition so that —SCH is up, C1Y is up, and a COMM A pulse appears. This satisfies all of the inputs to the logical circuit so that C1X is brought down. This removes a necessary logical input element from the first logic leg from the left, and the first or X latch remains in its down position since the feedback is no longer existent.

At the same time that the first latch is turned off, the third or C2 latch of the counter 77 is switched on in response to all of the requirements of the second logic leg from the left being satisfied. Thus, there is a —C1X condition, which occurs very quickly and in time to be entered, and —C3 and C1Y are up. Accordingly, C2 is brought to an up status; this is fed back to the first logic line on the left of the C2 latch in which all three conditions are satisfied since both —ST 0 and —ST 15 are up and C2, which was just created, is up. The third latch is latched up.

If a bit is encountered on the third channel (R2A) of the tape 12 by the transducer 11, it is read into output register stage 3 and only that stage since that is the only stage in which the logic is satisfied. Thus, in order for there to be an up signal at the output register stage 3, it will be noted that the left logic leg in the latch of output register stage 3 requires a bit being read (RD Bit) and all of C1Y, C2, —C3, and —C4 to be up. These are satisfied, and the signal is fed back to latch up the unique status found.

Further discussion of the output register stages beyond the output register stage 3 as they are set by bits read in status with the counter or clock 77 will not be made since this is a direct and clear extension from the prior discussion. The logic is shown in the drawings. It can be summarized by stating that each read (RD) bit, which is read by the transducer 11, is one input to each of the output register latches but that only a unique count condition, indicative of the arm 21 having swept the proper ones of the windings 63–72, is effective to fully satisfy the one, proper output register stage so that it will hold the RD Bit.

Discussion of the counter or clock 77 will be carried further. Thus, after the arm 21 has swept across three of the windings 63–65, it sweeps across the winding 66 to create another COMM B pulse. This pulse is operative to turn C1Y off as will be clear from noting the first logic leg from the right of the Y latch. The two conditions are satisfied. That is, —C1X is up and an COMM B pulse exists. The latched status of the Y latch is lost, and the Y latch takes up and holds a status indicative of —C1Y.

Examination of the logic of all the latches in the clock 77 shows that none of the other latches is affected and that the C2 latch remains on as the only latch in a switched condition. This relation is shown in the chart of FIG. 16. The data bit, if it exists, is then read into the output register stage 4.

The intersection of the commutator arm 21 with the next winding 67 creates a COMM A pulse. With a COMM A pulse being supplied and the output of the Y latch being —C1Y, the second logic leg on the left in the X latch is satisfied. C1X comes up and is latched up by the first logic leg on the left of the X latch.

C3 is also brought up. The second logic leg on the left of the C3 or fourth latch being satisified, and the feedback is to the first logic leg on the left of the C3 latch.

The data bit, if it exists on the fifth channel (SEARCH) of the tape 12, is read into OR5. No other register stage is affected since the status conditions of the clock 77 are operative to not satisfy the logic of any of the other output register stages.

The next or sixth commutator pulse is a COMM B pulse. This is effective to set the Y latch because C1X is up. Therefore, the second logic leg on the left of the Y latch is satisified by the existence of both the COMM B pulse and the C1X signal.

If a data bit is found in the sixth cannel (T1) of the tape 12, it will be read by the transducer 11 and stored only in the output register stage 6. None of the other output register stages will respond to this RD Bit.

The next or seventh pulse is a COMM A pulse. This is effective to turn the X latch off as will be verified by observing the first logic line from the right of the C1X latch in the drawing of FIG. 7*a*. Thus, —SCH, C1Y, and COMM A all exist to satisfy the logic and turn C1X off.

When the seventh pulse causes —C1X to be up, this results in turning off the C2 latch. The first logic line from the right in the C2 latch is satisfied when —C1X and C1Y along with C3 are up. This occurs when the X latch is turned off.

Accordingly, the seventh pulse, which is a COMM A pulse, turns off both the X and the C2 latches so that both —C1X and —C2 are up. C4 is also brought up since the second logic leg on the left of the C4 or fourth latch is satisfied by C1Y, —C2, and C3 being up and the COMM A pulse existing. The C4 latch is latched by the first logic leg on the left. It should be noted that —C2 comes up momentarily before C4 goes up.

The logic is not satisfied in the other latches of the clock 77, and they remain as they were. A data bit is read into output register stage 7 if it is found on the tape 12 in the seventh channel (T2) by the transducer 11.

The next or eighth emitter pulse is a COMM B pulse. This is effective to turn the Y latch off as the first logic line from the right of the Y latch of FIG. 7*a* is satisfied since —C1X is up and a COMM B pulse exists. C3 is up and is not affected by the logic.

Thus, when the eighth commutator pulse has been received, C1X, C1Y, and C2 are down while C3 and C4 are up. The ninth commutator or emitter pulse is a COMM A pulse. It is effective to bring the X latch up since the second logic leg from the left is satisfied; that is, there is a not search (—SCH) condition, —C1Y is up, and a COMM A pulse exists.

The C3 latch is brought down. This is because the first logic leg from the right of the C3 latch is satisfied; that is, —C2, C1X, and —C1Y are up.

At this point, a maximum of nine data bits has been read into the nine output register stages. They can be read from the output register stages of the output register 82 under the control of the data processing machine 84.

The output register stages are latches, and their logic is such that a ST 0 signal must be supplied to them before the data in them is destroyed. The ST 0 signal is indirectly produced by the data processing machine 84, the reread key 111, or the search key 109.

The commutator arm 21 continues running to produce one more pulse. This is a COMM B pulse. The Y latch is set since the second logic left leg to the left is satisified because C1X is up and there is a COMM B pulse. The logic to the other latches of the clock 77 is such as to not cause the other latches to change status.

Therefore, a ten count is represented by C1X ,C1Y, and C4 being up and C2 and C3 being down. The logic shown in FIG. 11 is responsive to this. Thus, the reader of the present invention immediately creates the 10 CT signal.

A check for odd parity of the digits read and held in the output register 82 is made by any convenient circuitry, preferably the type of circuitry herein described for the other logic of the machine. A purely illustrative illustration of the parity checking is shown in FIG. 25.

One type of circuit could check the groups of OR1–OR3, OR4–OR6, and OR7–OR9 to see if the sum of each were odd. Then, the output of each of these circuits could be checked to see if their sum were odd. If so, odd parity exists, and there is no parity error.

If there is no error in parity, then an error signal light 115 on the keyboard 108 will not be energized. If there were an error, the light 115 would be lit.

After the parity error check has been successfully made, an ODD signal is up. Thus, when 10 CT occurs at the latch clock 77, the right logic leg in the circuit of FIG. 15 is satisfied. As a result, an INCR signal is created.

This INCR signal is fed back to the left logic leg of the circuit of FIG. 15. Since —CR is up, this latches the circuit of FIG. 15 so that INCR will exist after 10 CT no longer exists.

The INCR signal is supplied to the stepping magnet 34. As a result, the ratchet 31 is stepped one tooth in the manner previously described.

When the transducer 11 returns to its home position, the HOME signal is supplied by the switch assembly 30 to the circuit of FIG. 15. As a result, the INCR now goes down and the magnet 34 is again de-energized. The timing is such that the tape 12 is stepped before the transducer 11 returns to its home position.

When the 10 CT signal is created, this indicates that all of the data from one row of the tape 12 has been traversed by the transducer 11 and has been recorded in the output register 82. Thus, this information is now ready to be read by the data processing machine 84 by being transferred thereto.

The 10 CT signal is one of the inputs to the logic line of the character ready circuit of FIG. 14. Other inputs to this logic line include a signal that the error light 115 is not on (—ER LT), no search signal (—SCH), a —RD signal (this occurs when none of the logic lines of FIG. 13 is satisfied), and the READ signal that indicates that this is the reader connected to the data processing machine 84.

When all of the foregoing are satisfied and this is true when there is no parity error and the tenth count has been produced by the latch clock 77, then a character ready (CHR) signal is produced so that —CHR goes down. This signal does not occur until all of the necessary contingencies, which might prevent a correct signal from being transmitted to the data processing machine 84, have been examined.

The data processing machine 84 responds to the character ready signal to open gates in the data processing machine 84 to thereby read the output register stages 1–7 and 9 (assuming that output register stage 8 is a parity bit since the eighth channel on the type 12 is parity). It will be understood that the data processing machine 84 can interpret the eight bits. They can be read serially or all in parallel or some of them can be blocked, gated closed, or changed in order or otherwise differently interpreted or handled by the data processing machine 84.

In the preferred embodiment, four of the bits in the stages of the output register 82 are read at a time, then the other four bits are read by the data processing machine 84. After the data from the reader has been read at the data processing machine 84, the character ready signal is cut off when a read command (RC) is generated. The chart of FIG. 17 shows this relation.

When the RC signal is generated, it produces a ST 0 signal in accordance with FIG. 12 since the READ signal is up. This is because it is assumed throughout this description that the data processing machine 84 has selected the reader to be read. RC is quite short in time as indicated in FIG. 17. However, the width of RC is sufficient to insure that all of the stages of the output register 82 have their data bits removed therefrom due to the supply of the ST 0 signal to the right logic leg of each of the latches of the output register 82.

It should be observed that neither of the other logical legs of the circuit of FIG. 12 is satisfied at this time. There is no RERD (reread signal) since this is created by depression of the keyboard reread key 111 so that the first leg is not satisfied. The third leg of the circuit of FIG. 12 is not satisfied since RD is down.

It should be understood that the triple inversion of polarity of the circuit of FIG. 12 is not a critical part of the present invention. It is merely a circuit to achieve increased fanout.

Thus, the circuit of FIG. 12 insures that the data, which has been read, is removed before the transducer 11 again traverses the tape 12. This traversing of the tape 12 by the transducer 11 occurs with another picking of the clutch magnet 24. When ST 0 is generated, the counter 77 is set to 0 CT so that the magnet 24 is picked whereby the reading operation continues.

In addition to the read operation, the reader of the present invention has several other operation sequences. These include load, unload, search, and reread.

Load

The purpose of the load operation is to advance the magnet tape 12 from the cartridge 23 into a useable position with respect to the transducer 11. Depression of the load key 110 will cause loading of the tape 12 if the cartridge 23 is properly positioned with the tape 12 connected to its leader. Of course, if the cartridge 23 is not present, then no action will result from depression of the load key 110.

The latch clock 77 is used during the load operation to control the operation of the reproducing unit 10 in response to various signals from various switches. The latch clock 77 is set at the count of 15 for load operations since this count is not utilized during the read operation, and the counter or clock 77 has sufficient counts to permit count 15 to be used during the load operation.

When the load key 110 is depressed and the cartridge 23 is positioned along with the tape 12 being connected to its leader, a —ST 15 signal is moved down from its normally up position. The dropping of the —ST 15 signal sets the latches of the latch clock 77 to provide a 15 CT signal. With the 15 CT signal being up, all of the sequences, required to load the tape 12 to position it for reading or searching, will automatically occur.

As shown in FIG. 19, the 15 CT signal is up when —C1X, C1Y, —C2, C3, and —C4 are up. Of course, as previously mentioned, C1X is up when C1X is down, —C2 is up when C2 is down, and —C4 is up when C4 is down.

When the -ST 15 signal goes down, the left logic leg of the X latch is no longer satisfied. Thus, if C1X were up, it is now down because -ST 15 is down. Of course, if C1X were already down, then the left logical leg would not have been satisfied previously because of the absence of C1X being up. Furthermore, there is no satisfaction of the second logical leg on the left of the X latch because there is no COMM A pulse. As a result, -C1X is up since the point 95 above the transistor 86 in FIG. 8 is at +12 volts.

In the Y latch, the second logical leg from the right is not satisfied when -ST 15 goes down. As a result, C1Y goes up. Of course, if C1Y were already up, it would stay up because the left logical leg of the Y latch is satisfied and is not affected by –ST 15.

When –ST 15 goes to ground, the left logical leg of the C2 latch is no longer satisfied. As a result, C2 goes down and –C2 is up if C2 had previously been up. Of course, if –C2 is up, then it stays up. Of course, for –C2 to have been up, it would have been necessary for both of the logical legs at the right to have been satisfied.

When –ST 15 goes to zero, the second logical leg from the right of the C3 latch is no longer satisfied. As a result, C3 is up. If C3 had already been up, then its feedback hold circuit through the first logical leg on the left would have maintained it when –ST 15 went down since –ST 15 is not an input thereto.

When –ST 15 goes to zero, the left logical leg of the C4 latch is no longer satisfied. As a result, –C4 goes up. If –C4 has been up, then it would stay up.

Accordingly, the dropping of –ST 15 by closing of the load key 110 creates the desired relation of the latches in the latch clock or counter 77. The logic leg of the circuit of FIG. 19 is satisfied so that a 15 CT signal is supplied from the circuit when the load key 110 is depressed.

When the load key 110 is depressed, it also causes a load search solenoid to be actuated whereby LSSS is brought up by closing a switch. When this occurs, the right logical leg of the circuit of FIG. 20 is satisfied. Thus, 15 CT is up and LSSS is up. Because the switch 57 has not sensed the narrow longitudinal slot in the tape 12 as yet because the tape 12 has not passed it, RWD is down so that –RWD is up. Accordingly, the detent solenoid 42 is picked. This results in the detent 32 being removed from the ratchet 31 so that the magnetic tape 12 would be advanced at a very rapid rate by the motor 15.

When the detent solenoid 42 is picked, the signal from LSSS causes sufficient movement of the plunger of the detent solenoid 42 to cause the shoe 45 to engage the clutch spring 46. As a result, the two-torque clutch, which connects the shafts 18 and 31', operates at its higher torque to cause the shaft 31' to be rotated at a much faster rate.

It should be understood that the load search solenoid cannot be picked if the switch 48 should indicate that the end of the tape has arrived at the roller 49. This is provided as a safety feature.

When the switch 57 is actuated through the roller 58 falling through the narrow longitudinal slot in the tape 12, the detent solenoid 42 is de-energized. This is because the right logic leg of FIG. 20 is no longer satisfied due to –RWD going down as a result of the switch 57 being energized due to sensing of the narrow longitudinal slot in the tape 12 by the roller 58.

As this time, the tape 12 is ready to be read by the transducer 11 to cause advancement of the tape 12 in increments until a carrier return (CRR RET) signal is developed from scanning the tape 12. The carrier return signal is provided on the tape 12 to permit final positioning of the tape 12 at the position in which the bits on the tape 12 may be read for transmittal to the data processing machine 84.

It should be understood that the solenoid 55 is energized after the leader sensing switch 56 senses the leader passing it whereby the steel leader is no longer beneath the transducer 11. Thus, the pressure pad 53 holds the tape 12 in contact with the transducer 11 when the solenoid 55 is picked to permit reading of the tape 12 by the transducer 11.

Of course, it should be understood that the left logic leg of FIG. 20 is not satisfied during a load operation. For example, 14 CT is not up since this is only up during a search operation. As will be explained hereinafter, the left logic leg is satisfied during a search operation only.

When the RWD signal goes up due to the switch 57 being actuated, the middle logic leg of the circuit of FIG. 13 is satisfied since 15 CT is already up. As a result, RD is up.

When RD is up, the right logic leg of the circuit of FIG. 12 is satisfied. This is because the transducer 11 is in its home position so that the switch assembly 30 is actuated to make HOME be up. As previously mentioned the detent solenoid 42 de-energizes as soon as RWD goes up. De-energization of the detent solenoid 42 positions the switch assembly 47 so that –DNT went up. This indicates that the detent 32 is again engaged with the teeth of the ratchet 31 so that the tape 12 can now only be driven in increments.

When the right logic leg of the circuit of FIG. 12 is satisfied, –ST 0 goes down. As a result, C1Y goes down. It will be recalled that C1X, C2, and C4 are already down due to –ST 15 having dropped. Thus, when C1Y goes down so that only C3 is up, the latches of FIG. 7*a* are in the zero count position. This is the position in which the clutch magnet 24 is picked by the right logic leg of FIG. 23 being satisfied to start a cycle whereby the transducer 11 moves transversely across the tape 12.

As the transducer 11 moves transversely across the tape 12, the bits on the tape 12 are read and stored in the output register 82 under the selection control of the latch clock 77. The bits in the output register 82 are supplied to the logic leg of the carrier return circuit of FIG. 21. A certain arrangement of these bits occurs on the tape 12 to provide the carrier return signal.

Accordingly, when the leg of the circuit of FIG. 21 is satisfied, –CRR RET is down. In addition to the bits supplied to the logic leg of FIG. 21, 10 CT, ODD, and –RWD must be up for –CRR RET to go down. Of course, the –RWD is up as soon as the narrow longitudinal slot in the tape 12 is advanced past the switch 57 so that it is no longer actuated. The 10 CT is up at the completion of each cycle of reading of the bits on the tape 12 by the transducer 11. The ODD signal is up after parity has been checked as shown illustratively in FIG. 25 to insure that a correct signal has been read. Until all these conditions have been satisfied, the –CRR RET is up.

The left logic leg of the circuit of FIG. 13 remains satisfied as long as –CRR RET is up so that RD is continuously up. This is because RD is fed back as one of the inputs to the left leg. The third input to the leg is –CR. The common reset signal allows –CR to remain up except when the common reset is set. This occurs only at the start of operation of the reader, at the end of the tape 12, and when the tape 12 is unloaded from the unit 10.

When the 10 CT is up at the end of each reading cycle, the middle logic leg of the circuit of FIG. 15 is satisfied since RD is up. As a result, INCR is up. This causes the tape 12 to be advanced one step due to the energization of the magnet 34 by INCR being up whereby the pawl 36 is moved to engage one of the teeth of the ratchet 31.

The first logic line on the left of the circuit of FIG. 15 is a feedback circuit. It retains INCR up until the transducer 11 returns to its home position. When this occurs, HOME goes up so as to turn off the output of INCR and also stop its feedback since the dropping of INCR removes the up level to the first logic line on the left.

It should be recalled that —CR is up at most times. Thus, this insures that the left logic line stays satisfied as long as INCR is up.

Additionally, as the transducer 11 returns to its home position, the right logic leg of FIG. 12 is again satisfied since RD is still up. This again causes —ST 0 to go down whereby the latch counter 77 returns to zero count and the latches of the output register stages of the output register 82 are cleared.

This continued cycling of the transducer 11 across the tape 12 continues until the circuit of FIG. 21 is satisfied. When this occurs, —CRR RET goes down so that the left logic leg of FIG. 13 is no longer satisfied. As a result, RD goes down whereby the right logic leg of FIG. 12 is no longer satisfied so that this logic leg does not cause —ST 0 to go down.

It should be observed that neither of the other two logic legs of FIG. 12 is satisfied at this time. That is, RERD is down since it is only up when the reread key 111 is depressed.

The center logic leg of FIG. 12 is not satisfied since RC is down. This is the read command signal, which is generated by the data processing machine 84 after a character ready signal has been supplied to the data processing machine 84 from the reader of the present invention. Of course, READ is satisfied since it is assumed throughout this description that the data processing machine 84 has selected the reader to be read.

With none of the three legs of FIG. 12 satisfied, —ST 0 stays up. As a result, the carrier return character remains on the stages of the output register 82 and the latch counter or clock 77 is at 10 count.

It should be noted that the middle logic leg of FIG. 15 is satisfied when 10 CT is up. Thus, before RD goes down due to the logic leg of FIG. 21 being satisfied, INCR is up so as to cause the tape 12 to be advanced one step.

As soon as RD goes down so that —RD comes up, the logic leg of FIG. 14 is satisfied. That is, there is no error light on (—ER LT is up), READ is up, 10 CT is up, and there is no search operation being conducted so that —SCH is up. Accordingly, satisfaction of the logic leg of FIG. 14 causes —CRH to go down so that a character ready (CHR) signal is up.

The transmission of CHR to the data processing machine 84 results in the character read, which is the carrier return code on the output register 82, being transmitted to the data processing machine 84. This signal may be used to produce various functions within the machine 84 or it may be ignored.

With CHR being transmitted to the data processing machine 84, the data will be accepted and a read command (RC) signal will be generated by the data processing machine 84 for transmittal to the reader. When this occurs, the middle logic leg of the circuit of FIG. 12 is satisfied so that —ST 0 goes down. As a result, the latches of the latch clock or counter 77 return to the zero count position and the bits of data in the output register 82 are removed.

CHR goes down as soon as 10 CT goes down. 10 CT is extinguished as soon as the RC signal is supplied to the circuit of FIG. 12 by the data processing machine 84.

The read operation now begins and continues in the manner previously described.

Search

The purpose of the search operation in the reader of the present invention is to advance the tape 12 to the next message thereon.

When the search key 109 is depressed, —ST 14 goes down so an ST 14 signal goes up. This is effective to set the latch counter or clock 77 at count 14 so that the latches of the latch counter or clock 77 will control the search operation sequences.

When the logic leg of FIG. 22 is satisfied, 14 CT is up. This occurs when C1X, C1Y, C2, C3, and C4 are all up. These conditions will be met by the latches of the latch clock 77 when —ST 14 goes down due to the search key 109 being depressed.

Since the search key 109 is only depressed after a read operation is completed, the latches of the latch clock 77 are already at count 10 whereby C1X, C1Y, and C4 are up while C2 and C3 are down.

Referring to FIG. 7*a*, the C1X signal can be brought down when it is up only when one of the two logic lines to the right is completely satisfied. Since —ST 14 is now down, the left of the two logic lines on the right is not satisfied. The right logic line is not satisfied because there is no COMM A pulse since the transducer 11 is not moving at this time. Thus, C1X remains up.

Neither of the two logic lines on the right of the Y latch is satisfied when the search key 109 is depressed so that C1Y remains up. Thus, —ST 14 is down so that the second logic line from the right is no longer satisfied, and there is no COMM B pulse since the transducer 11 is not moving so that the right logic line is not satisfied. Accordingly, C1Y remains up.

When the search key 109 is depressed, —ST 14 goes to zero or approximately ground potential so that the second line from the right in the C2 latch is no longer satisfied. As a result, C2 goes up and —C2 goes down. The C2 latch is latched in this position because of the satisfaction of the left logic line of the latch since both —ST 0 and —ST 15 are up and C2 is now up due to —ST 14 being down.

In the C3 latch, the second logic line from the right includes —ST 14. Because —14 is now down, the second logic line from the right is no longer satisfied. As a result, C3 goes up. Because of the feedback due to C3 being up, the left logic line of the C3 latch is satisfied so that the C3 latch is latched up.

As previously mentioned, C4 is already up because of the fact that the counter 77 must be at count 10 when the search key 109 is depressed. Accordingly, C4 remains up.

All five of the latches now are up so that the circuit logic leg of FIG. 22 is satisfied. As a result, 14 CT is up and causes SCH to be up whereby two different operations occur.

One of these is that the load search solenoid is energized whereby LSSS is brought up by closing a switch. The other is picking of the clutch magnet 24.

The left logic leg of FIG. 23 is satisfied when SCH is up since —RD and HOME are up. As a result, a signal is provided to pick the clutch magnet 24.

It will be recalled that HOME is up whenever the home switch assembly 30 is operated due to the transducer 11 being in its home position. Of course, this is the position of the transducer 11 at the time that the search key 109 is depressed because the search key 109 is depressed at the time when a read cycle has been completed.

—RD is up because the circuit of FIG. 13 does not have any of its three legs satisfied at this time. The left leg is not satisfied because there is no RD signal, the middle leg is not satisfied because both of these inputs are down, and the right leg is not satisfied because R Bit is not up until a search bit is found by the transducer 11 on the tape 12 during the search operation.

When LSSS is up due to the load search solenoid being energized, the left logic leg of the circuit of FIG. 20 is satisfied. Both —RD and 14 CT are up. The other input (SP) also is up as will be explained hereinafter. As a result, the detent solenoid 42 is picked. This removes the detent 32 from the teeth of the ratchet 31 whereby the ratchet 31 is now free to rotate rapidly to allow fast advancement of the tape 12 by the motor 15.

Of course, as described with respect to the load operation, energization of the load search solenoid allows the plunger of the detent solenoid 42 to move sufficiently to permit the shoe 45 to engage the clutch spring 46. This permits faster rotation of the shaft 31'.

As shown in FIG. 24, there is a circuit for controlling the energization and de-energization of the search position magnet 25. When the magnet 25 is energized, the armature 26 is held out of the path of the extension 28 on the slide 20 of the transducer 11. Accordingly, when the search position magnet 25 is energized, the transducer 11 may complete a full cycle of transverse movement across the tape 12 and return to its home position.

When the search key 109 is depressed, it is desired to position the transducer 11 so that it is disposed over the fifth channel of bits on the tape 12 of FIG. 2. Accordingly, the energization of the clutch magnet 24 causes the head 11 to move across the tape 12. On its return, the movement of the transducer 11 is stopped by the extension 28 on the slide 20 engaging the armature 26 due to the search position magnet 25 being de-energized. This positions the transducer 11 so that it reads only the bits in the fifth channel on the tape 12.

If any of the logic lines of FIG. 24 is satisfied the magnet 25 is not picked.

The lower logic leg is satisfied at the end of each read cycle. Thus, —RD is up since none of the three logic legs of FIG. 13 is satisfied. C4 is up at 10 count as shown in FIG. 16. When the transducer 11 reaches its home position, HOME is up. Accordingly, the search position magnet 25 is turned off at the end of each cycle of the transducer 11 moving across the tape 12.

It will be noted that the upper right logic leg of FIG. 24 includes HOME and SP. SP is up only when the search switch assembly 29 (see FIG. 1) is closed. The switch assembly 29 is closed when the transducer 11 is locked over the search channel of the tape 12. Thus, except for an isolated instance in which the switch assembly 29 fails to open after the transducer 11 is unlocked and returns to home, the upper right logic leg is never satisfied. This is a safety feature to insure that the armature 26, which has been urged into contact with the switch assembly 29 by the slide extension 28, returns to its normal position so that the switch assembly 29 opens to give the correct signal to SP.

During all opeartions except search operation, SCH is always down. Thus, the left upper logic leg is not satisfied during all operations except search. As a result, as soon as the transducer 11 leaves its home position during all operations except search, none of the logic lines of FIG. 25 is satisfied so that the magnet 25 is picked.

During search, the upper left logic line is satisfied since —RD is up and SCH is up due to 14 CT being up. Thus, the magnet 25 remains de-energized and the transducer 11 is locked over the fifth channel on the tape 12 on the return of the transducer 11 to its home position.

From the foregoing, depression of the search key 109 creates a plurality of different actions. These include picking of the clutch magnet 24 to start movement of the transducer 11 transversely across the tape 12, removal of the detent 32 from the teeth of the ratchet 31, increasing the torque of the two-torque clutch between the shafts 18 and 31' to get faster advancement of the tape 12, and de-energization of the search position magnet 25 to permit the armature 26 to be biased by the spring 27 into a position to stop the movement of the transducer 11 on its return path so that the transducer 11 is positioned over the fifth channel on the tape 12 due to engagment between the armature 26 and the extension 28 on the slide 20 of the transducer 11.

The tape 12 is now advanced very rapidly by the motor 15 until the transducer 11 senses a search bit in the fifth channel on the tape 12. Actually, these may be a plurality of bits closely adjacent to each other.

When this occurs, R Bit goes up because the transducer 11 is receiving the search bit signal. As a result, the right logic leg of FIG. 13 is now satisfied.

This satisfaction of the right logic leg is due to the fact that SP is up because the search position magnet 25 is de-energized whereby the switch assembly 29 is closed. Likewise, DNT is up because the detent 32 is not engaged with the detent 31. This is due to the solenoid 42 being picked and DNT is up because of the signal from the detent switch assembly 47 indicating that the detent solenoid 42 has been picked.

Accordingly, as a result of the search bit being sensed by the transducer 11, RD is now up. When this occurs, —RD goes down so that the left logic leg of FIG. 20 is no longer satisfied whereby the detent solenoid 42 is no longer picked. This will cause DNT to go down.

However, before this occurs, the left logic leg of FIG. 13 is satisfied due to RD being supplied thereto since it is up. It will be observed that —CRR RET and —CR are up. —CRR RET does not go down until a carrier return signal is sensed in the same manner as previously described with respect to the load operation.

When —RD goes down, the logic leg of FIG. 24 also is no longer satisfied. Since the transducer 11 is not at home, the other two logic legs of FIG. 24 are not satisfied. As a result, the search position magnet 25 is picked to allow the transducer 11 to be returned to its home position by the spring 24'.

After the transducer 11 returns to its home position, it continues to cycle across the tape 12 in the same manner as described for the load operation. Thus, the right logic leg of FIG. 12 continues to be satisfied at the completion of each return of the transducer 11 to its home position since RD remains up until the carrier return signal (CRR RET) is received by the transducer 11.

When CRR RET is received by the transducer, then —RD occurs in the same manner as previously described for the load operation. As a result, the character ready signal (CHR) is transmitted to the data processing machine 84, and the remainder of the operation is the same as described for the load operation. The reader of the present invention would then be ready to proceed with the read operation as previously described.

Reread

The purpose of the reread operation is to reread the tape 12 in the position in which it has produced an invalid character. Thus, the reread key 111 would only be depressed when the error signal light 115 is energized on the keyboard 108.

The error signal light 115 is energized only when there is a parity error. When a parity error occurs, the first logic line on the right of FIG. 15 is not satisfied because ODD is down. As a result, INCR is not moved up at ten count so that the tape 12 is not advanced when there is a parity error.

Accordingly, when the reread switch key 111 is depressed, RERD of FIG. 12 is up so that the left logic line of FIG. 12 is now satisfied. Accordingly, —ST 0 goes down whereby all of the stored bits on the stages of the output register 82 are removed and the latches of the latch counter or clock 77 are returned to the set zero position. This is a zero count position. As soon as the reread key 111 is released, the clutch magnet 24 also is picked to insure that the transducer 11 makes another cycle across the tape 12.

If the signal on the tape 12 is now transmitted correctly, then INCR of FIG. 15 is up so that the tape 12 can be advanced one increment. If the parity error should again occur, then INCR would stay down and the error signal light 115 would again be energized. The operator would then again depress the reread key 111 to cause another reread cycle. After the correct signal has been received, the operation of reading will continue in the previous manner.

Unload

The purpose of the unload operation is to restore the tape 12 to the cartridge 23 from the reproducing unit 10. Depression of the unload key 107 results in the tape 12 being unloaded.

The unload key 107 and the load key 108 are interlocked so that only one may be pressed at any time. Furthermore, when the unload operation sequence is initiated, it overrides any other operation sequence then in being.

When the unload key 107 is depressed, the latch counter or clock 77 is moved to count 13. This is accomplished by providing a common reset (CR) signal up when the unload key 107 is depressed. As a result, —CR goes down.

Referring to FIG. 7*a*, it will be observed that no signal is applied to the X latch. However, C1X is up since its right logic leg is not satisfied and it is latched up by its left logic leg. By not connecting a signal to the X latch, a cost saving in structure is obtained.

Since the left logic leg of the Y latch includes —CR, moving —CR down due to the depression of the unload key 107 results in the left logic leg not being satisfied so that C1Y goes down.

In the C2 latch, the second leg from the right includes —CR. As a result, when —CR goes down, this insures that C2 goes up. The left logic leg of the C2 latch includes —ST 0 and —ST 15 along with C2. Since the first two of these are up, then C2 being up satisfies this leg so that C2 is locked or latched in its up position.

Of course, if C2 were already up, then —CR going down would not affect the latch. In other words, it would remain with C2 up.

The second logic leg from the right of the C3 latch includes —CR as one of the inputs. Thus, when —CR goes down, this logic line is no longer satisfied so that C3 will be moved up. Because the left logic leg contains only C3, this insures that C3 remains latched up.

If C3 should have been up before depression of the unload key 107, then C3 would remain up notwithstanding that —CR went down. This is because C3 would already have been latched up through its left logic leg.

In the C4 latch, the right logic leg includes only —CR as an input. Thus, when —CR goes down, C4 would go up. Because —ST 0 and —ST 15 are both up, moving C4 up satisfies the left leg of the C4 latch. As a result, C4 is latched up.

Of course, if C4 were already up and —C4 down, —CR going down would not change the arrangement of C4 being up. That is, C4 would remain up because it would already be latched up through the left logic line.

The depression of the unload key 107 also causes the two-torque clutch, which connects the shaft 22 to the drive shaft 16, to be at its higher torque then when it is normally applying bias. As a result, the cartridge 23 is driven in a reverse direction to pull the tape 12 into the cartridge 23.

Of course, it is necessary to pick the detent solenoid 42 before this fast retraction of the tape 12 from the reproducing unit 10 can occur. Accordingly, the solenoid 42 is picked at the same time that the clutch, which connects the shaft 22 to the shaft 16, is driven at its higher torque to cause a greater speed of rotation of the shaft 22.

However, since the load search solenoid is not picked in unload, the movement of the plunger of the detent solenoid 42 is limited to only moving the detent 32 out of the teeth of the ratchet 31. The detent solenoid 42 does not move its plunger sufficiently to engage the shoe 45 with the clutch spring 46.

The fast retraction of the tape 12 continues until the leader sensing switch 56 senses the narrow portion of the steel leader, which is attached to the tape 12 at its forward end. When this occurs, the clutch, which connects the shaft 22 to the drive shaft 16, has its torque reduced so that the shaft 22 is only applying bias to the tape 12.

The energization of the switch 56 also causes de-energization of the solenoid 55 whereby the pressure pad 53 is removed from holding the tape 12 in engagement with the transducer 11. This insures that the steel leader does not contact the transducer 11 during the final portion of the passage of the steel leader to its position adjacent the cartridge 23.

From the foregoing, it will be readily observed that the reader of the present invention has numerous functions controlled by the latch clock 77. Thus, the latch clock 77 not only insures that the data bits from the magnetic tape 12 are positioned in the correct output register stages of the output register 82 but it also insures that the tape 12 can be loaded in the reproducing unit, unloaded from the reproducing unit 10, and searching of the tape 12 can occur to find a desired message thereon. Furthermore, the latches of the latch clock 77 permit the rereading of the tape when a parity error occurs.

Thus, the reader of the present invention has its controls so designed through the latch clock 77 that all of its functions are controlled thereby. This reduces the cost for circuits.

It should be noted that all of the counts of the latch clock 77 are not employed for any operation of the reader. For example, only counts 0–10 are used in reading and rereading.

In loading, only count 15 is used until the switch 57 is actuated, and then only counts 0–10 are utilized until a coded signal is found on the tape 12 to complete the load operation. In searching, only count 14 is used until data bits are found in the search channel on the tape 12, and then only counts 0–10 are employed until the search operation is completed when a coded signal is found on the tape 12.

In starting the data processing machine 84 and the reader and unloading the reproducing unit 10 only count 13 is used to indicate these operations. This count does not control any operations in the latch clock 77.

However, when CR is generated, the latches in the latch clock are positioned by CR or C1Y is down and C1X, C2, C3, and C4 are up. This insures a specific relation of the latches of the latch clock 77 when the data processing machine 84 is connected to power or an unload operation occurs.

While the transducer 11 has been described as a magnetic head and the tape 12 as magnetic, it should be understood that other types of suitable transducers and tapes could be employed. For example, the transducer 11 could be an optical reader, and the tape 12 could have punched holes therein for reading by the optical reader.

It should be understood that each of the two sets of windings (63, 65, 67, 69, and 71 and 64, 66, 68, 70, and 72) may be arranged other than in series as long as the out of phase signals (COMM A and COMM B) are supplied to the latch clock 77. For example, each set of windings could have the windings connected in parallel or each of the windings could be connected separately to the inputs of the latch clock to which it is to be supplied.

While the pulses (COMM A and COMM B) have been described as formed by a magnetic emitter, it should be understood that other types of control means could be used. For example, an optical emitter could be employed. This would include a rotating slotted disc, which is synchronized with the transducer 11, a light source, and a photo sensing device.

While a specific coded signal (then carrier return signal) has been shown as the signal for stopping load and search operations, it should be understood that other coded signals may be employed for this purpose. Of course, several different coded signals might be employed with the location of any one of the coded signals on the tape 12 functioning to stop the load and search operations.

An advantage of this invention is its relatively low cost in comparison with previous readers having controls. Another advantage of this invention is that it eliminates the requirement for trigger circuits. A further advantage of this invention is that the latch clock permits the use of redundant signals to generate new logic. Still another advantage of this invention is that it reduces circuitry by using the same character signal on the tape for final tape positioning during both the load and search operation sequences.

While the invention has been particularly shown and described with reference to a preferred embodiment thereof, it will be understood by those skilled in the art that various changes in form and details may be made therein without departing from the spirit and scope of the invention.

What is claimed is:

1. A reader for reading data bits from a record or the like, said reader including:

means for reading the record by movement relative to the record to be read;

means to produce two alternating series of signals;

means to correlate said alternating series of signals of said producing means with the relative movement between said reading means and the record to cause each of said signals from said producing means to be produced prior to said reading means being positioned to receive a data bit from the record;
storing means to receive from said reading means any data bits on the record, said storing means including a plurality of stages;
counting means to receive said alternating series of signals from said producing means, said counting means controlling said storing means in accordance with said alternating series of signals to insure that each of said stages of said storing means stores the appropriate data bit from the record;
and said counting means including a plurality of bistable elements with each of said elements being steered by the condition of at least one of the other of said elements and the incoming signal from said producing means.

2. The reader according to claim 1 in which:
each of said bistable elements is a latch, said latches being connected to adopt a combination of unique states for each of said signals from said producing means;
and said stages of said storing means being controlled by the combination of unique states of said latches whereby only one of said stages is capable of storing a data bit received from said reading means for any one of said signals.

3. The reader according to claim 1 in which said reading means is a transducer and said producing means is synchronized with the relative movements of said transducer.

4. The reader according to claim 3 in which:
each of said bistable elements is a latch, said latches being connected to adopt a combination of unique states for each of said signals from said producing means;
and said stages of said storing means being controlled by the combination of unique states of said latches whereby only one of said stages is capable of storing a data bit received from said reading means for any one of said signals.

5. The reader according to claim 4 including:
means to move said transducer transversely of the record during reading;
and means to hold said transducer in a predetermined transverse position when the record is moved with respect to said transducer, said transducer holding means being actuated during operations other than reading.

6. The reader according to claim 5 in which said counting means includes means controlling said transducer holding means.

7. The reader according to claim 5 in which:
means inactivates said transducer holding means when a predetermined data bit exists on the record;
and means to automatically return the reader to a reading operation after said transducer holding means is inactivated.

8. A reader for reading data bits from a record or the like, said reader including:
storing means adapted to store data bits received from the record;
counting means adapted to control the storage position in said storing means of each of the data bits;
first means to set said counting means at various combinations of unique states whereby said counting means controls the storage position in said storing means of each of the data bits;
and second means to set said counting means to at least one other combination of unique states to control at least one other function of said reader.

9. The reader according to claim 8 in which said counting means includes:
a plurality of latches;
said first setting means sets said latches to a unique combination state prior to said storing means receiving a data bit from the record;
and said second setting means sets said latches to at least one other combination of unique states.

10. The reader according to claim 8 in which said first setting means includes means to provide alternate series of signals to said counting means in accordance with the position of a reading means movable relative to the record for reading the data bits from the record.

11. The reader according to claim 8 including means to return said counting means to the start of its count by said first setting means to again store the data bits in said storing means after completion of the function controlled by said counting means.

12. A reader for reading a group of data bits from a record or the like, said reader including means for reading the data bits on the record by movement relative to the record to be read, storing means to receive any data bits from the reading means for storage therein, and counting means to control the storage position of the data bits in the storing means, the improvement comprising:
first means to determine if a parity error exists;
second means responsive to said first means and to a predetermined state of said counting means to provide a signal that the data bits in the storing means are ready for transmission from said reader only after said first means has determined that no parity error exists;
and said second means includes means to produce relative movement between the record and the reading means to position the next sequential group of data bits on the record for reading by the reading means only when said first means has determined that no parity error exists.

13. A reader for reading data bits from a record or the like including:
storing means adapted to store each group of sequential groups of data bits received from the record;
counting means adapted to control the storage position in said storing means of each of the data bits in each of the groups;
first means to set said counting means at various combinations of unique states whereby said counting means controls the storage position in said storing means of each of the data bits in each of the groups;
means to return said counting means and said storing means to a position in which another group of data bits may be stored by said storing means;
second means to set said counting means to at least one other combination of unique states to control at least one other function of said reader;
and means to return said counting means and said storing means to the position in which another group of data bits may be stored by said storing means after the controlled function is completed.

14. The reader according to claim 13 including:
means for reading the record by movement relative to the record to be read;
means to produce two alternating series of signals;
means to correlate said alternating series of signals of said producing means with the relative movement between said reading means and the record to cause each of said signals from said producing means to be produced prior to said reading means being positioned to receive a data bit from the record;
said reading means supplying the data bits to said storing means;
and said counting means receiving said alternating series of signals from said producing means.

15. The reader according to claim 14 in which:
said counting means includes a plurality of bistable elements;
each of said bistable elements is a latch, said latches being connected to adopt a combination of unique states for each of said signals from said producing means;

and said stages of said storing means being controlled by the combination of unique states of said latches whereby only one of said stages is capable of storing a data bit received from said reading means for any one of said signals.

16. The reader according to claim 14 in which said reading means is a transducer and said producing means is synchronized with the relative movements of said transducer.

References Cited

UNITED STATES PATENTS

| | | | |
|---|---|---|---|
| 2,922,989 | 1/1960 | Mendelson et al. | 340—172.5 |
| 2,858,526 | 10/1958 | Deutsch | 340—172.5 |
| 2,856,595 | 10/1958 | Selmer | 340—172.5 |
| 3,337,852 | 8/1967 | Lee et al. | 340—172.5 |
| 3,317,902 | 5/1967 | Michael | 340—172.5 |
| 3,289,174 | 11/1966 | Brown et al. | 340—172.5 |
| 3,212,061 | 10/1965 | Merfeld | 340—172.5 |
| 3,195,118 | 7/1965 | St. Clair. | |
| 3,192,515 | 6/1965 | Pingry. | |
| 3,142,042 | 7/1964 | Te-an Ling | 340—172.5 |
| 3,139,521 | 6/1964 | Johnson | 340—172.5 |
| 2,996,699 | 8/1961 | Kramskoy | 340—172.5 |
| 3,102,997 | 9/1963 | Dirks | 340—172.5 |
| 2,986,725 | 5/1961 | Dirks. | |

GARETH D. SHAW, Primary Examiner

U.S. Cl. X.R.

235—61